(12) United States Patent
Hartsing et al.

(10) Patent No.: US 11,461,328 B2
(45) Date of Patent: Oct. 4, 2022

(54) METHOD FOR USING A SEMATIC MODEL TO TRANSFORM SQL AGAINST A RELATIONAL TABLE TO ENABLE PERFORMANCE IMPROVEMENTS

(71) Applicant: Oracle International Corporation, Redwood Shores, CA (US)

(72) Inventors: James Hartsing, Nashua, NH (US); Raghuram Venkatasubramanian, Cupertino, CA (US); Anne Murphy, Cambridge, MA (US); Scott Feinstein, Orlando, FL (US); Bei Yu, Burlington, MA (US); Steven Mesropian, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/027,238

(22) Filed: Sep. 21, 2020

(65) Prior Publication Data
US 2022/0092069 A1 Mar. 24, 2022

(51) Int. Cl.
*G06F 16/2453* (2019.01)
*G06F 16/22* (2019.01)

(52) U.S. Cl.
CPC .... *G06F 16/24544* (2019.01); *G06F 16/2282* (2019.01); *G06F 16/24537* (2019.01)

(58) Field of Classification Search
None
See application file for complete search history.

(56) References Cited

U.S. PATENT DOCUMENTS

| | | | | |
|---|---|---|---|---|
| 5,897,632 A | * | 4/1999 | Dar | G06F 16/24539 |
| 5,960,428 A | | 9/1999 | Lindsay | |
| 5,991,754 A | * | 11/1999 | Raitto | G06F 16/24539 |
| 6,339,769 B1 | * | 1/2002 | Cochrane | G06F 16/24539 |
| 6,449,605 B1 | * | 9/2002 | Witkowski | G06F 16/24537 |
| 6,449,606 B1 | | 9/2002 | Witkowski | |

(Continued)

OTHER PUBLICATIONS

U.S. Appl. No. 14/033,271, filed Sep. 20, 2015, Office Action dated Jul. 21, 2015.

(Continued)

*Primary Examiner* — Christopher J Raab
(74) *Attorney, Agent, or Firm* — Hickman Becker Bingham Ledesma LLP; Brian N. Miller

(57) ABSTRACT

Herein, a computer stores metadata that defines an analytic view that is based on organizing operation(s) that respectively specify organizing column(s) of organizing table(s), including a join operation that specifies a dimension column of a dimension table and a join column of a fact table. An original query is received that does not reference the analytic view. The original query specifies at least one organizing operation that is identical, somewhat similar, or compatible to an organizing operation on which the analytic view is based. Based on that at least one organizing operation that the original query specifies and the metadata that defines the particular analytic view, the original query is determined to satisfy rewrite criterion(s). In response to determining that the original query satisfies the rewrite criteria, a rewritten query that references the analytic view is generated based on the original query that does not reference the analytic view.

21 Claims, 6 Drawing Sheets

(56) References Cited

U.S. PATENT DOCUMENTS

| | | | |
|---|---|---|---|
| 6,477,536 | B1 | 11/2002 | Pasumansky et al. |
| 6,618,729 | B1 | 9/2003 | Bhashyam et al. |
| 6,711,563 | B1 | 3/2004 | Koskas |
| 7,546,226 | B1 | 6/2009 | Yeh et al. |
| 8,359,325 | B1* | 1/2013 | Gui .................. G06F 16/986 707/760 |
| 8,510,261 | B1 | 8/2013 | Samantray |
| 9,146,955 | B2 | 9/2015 | Nos et al. |
| 9,251,210 | B2 | 2/2016 | Chaudhry et al. |
| 9,519,701 | B2 | 12/2016 | Amule et al. |
| 9,619,581 | B2 | 4/2017 | Hughes et al. |
| 9,916,352 | B2 | 3/2018 | Chaudhry et al. |
| 10,067,954 | B2 | 9/2018 | Kociubes et al. |
| 10,558,659 | B2 | 2/2020 | Hopeman et al. |
| 10,740,333 | B1 | 8/2020 | Betawadkar-Norwood et al. |
| 2001/0013030 | A1* | 8/2001 | Colby .................. G06F 16/22 |
| 2002/0095397 | A1 | 7/2002 | Koskas |
| 2002/0095421 | A1 | 7/2002 | Koskas |
| 2004/0122844 | A1 | 6/2004 | Malloy et al. |
| 2004/0139061 | A1 | 7/2004 | Colossi et al. |
| 2004/0153435 | A1 | 8/2004 | Gudbjartsson et al. |
| 2010/0299367 | A1 | 11/2010 | Chakrabarti et al. |
| 2013/0060780 | A1 | 3/2013 | Lahiri |
| 2013/0117255 | A1 | 5/2013 | Liu et al. |
| 2013/0238637 | A1* | 9/2013 | Gupte .............. G06F 16/24556 707/752 |
| 2014/0244690 | A1 | 8/2014 | Vundavalli |
| 2014/0372411 | A1 | 12/2014 | Attaluri |
| 2015/0088809 | A1 | 3/2015 | Kociubes et al. |
| 2016/0147833 | A1 | 5/2016 | Chaudhry et al. |
| 2017/0017683 | A1 | 1/2017 | Fourny et al. |
| 2017/0255675 | A1 | 9/2017 | Chavan |
| 2018/0089261 | A1 | 3/2018 | Li |
| 2018/0182049 | A1* | 6/2018 | Oberle ................ G06F 16/2457 |
| 2018/0341677 | A1* | 11/2018 | Fan .................. G06F 16/24537 |
| 2019/0102412 | A1 | 4/2019 | MacNicol et al. |

OTHER PUBLICATIONS

U.S. Appl. No. 14/033,271, filed Sep. 20, 2013, Office Action dated Nov. 14, 2016.

U.S. Appl. No. 14/033,271, filed Sep. 20, 2013, Office Action dated Jul. 21, 2015.

U.S. Appl. No. 14/033,271, filed Sep. 20, 2013, Interview Summary dated Aug. 18, 2016.

U.S. Appl. No. 14/033,271, filed Sep. 20, 2013, Final Office Action dated Mar. 15, 2016.

Kociubes, U.S. Appl. No. 14/033,271, filed Sep. 20, 2013, Notice of Allowance dated Aug. 2, 2017.

Kociubes, U.S. Appl. No. 14/033,271, filed Sep. 20, 2013, Interview Summary dated Jan. 30, 2017.

Kociubes, U.S. Appl. No. 14/033,271, filed Sep. 20, 2013, Final Office Action dated Apr. 12, 2017.

Hopeman IV, U.S. Appl. No. 15/918,132, filed Mar. 12, 2018, Notice of Allownace dated May 19, 2020.

TPC Benchmark H Standard Specification Revision 2.17.1, dated Jun. 2013, located on webpage http://tpc.org/tpch/spec/tpch 2.17.1.pdf, 136 pages.

S. Bellamkonda, "Enhanced Subquery Optimizations in Oracle", PVLDB, 2(2):13661377, dated 2009, 12 pages.

Rittmanmead, "Metadata Modeling in the Database with Analytic Views", Oracle Database, analytic views, metadata, obiee, DVD, database, analytic view, self-service reporting, Apr. 3, 2017, 15 pages.

Oracle° Database, "Database In-Memory Guide", 12c Release 2 (12.2), dated Jan. 2019, 227 pages.

Oracle° Database, "Database Data Warehousing Guide", 12c Release 2 (12.2), dated Jan. 2018, 699 pages.

Oracle, "Oracle Database In-memory: In-Memory Aggregation", Oracle White Paper, Jan. 2016, 13 pages.

Live SQL, "Creating Analytic Views—Getting Started", dated Jan. 4, 2017, 22 pages.

KD Nuggets, "Apache Arrow and Apache Parquet: Why We Needed Different Projects for Columnar Data, on Disk and In-Memory", www.kdnuggets.com/2017/02/apache-arrow-parquet-columnar-data, Feb. 2017, 8pgs.

Fu et al., "CubiST: a New Algorithm for Improving the Performance of Ad-hoc OLAP Queries", dated 2000, 8 pages.

Eich et al, "Faster Plan Generation through Consideration of Functional Dependencies and Keys", PVLDB, vol. 9, dated 2016, 12 pages.

Oracle, "Oracle® Database 2 Day + Data Warehousing Guide 11g Release 2 (11.2)", dated Feb. 2012, 130 pages.

Cohen et al., "Rewriting Queries with Arbitrary Aggregation Functions Using Views", ACM Transactions on Database Systems (TODS) (TODS), vol. 31, No. 2, Jun. 2006, pp. 672-715.

\* cited by examiner

METHOD FOR USING A SEMATIC MODEL TO TRANSFORM SQL AGAINST A RELATIONAL TABLE TO ENABLE PERFORMANCE IMPROVEMENTS

RELATED CASES

The following related references are incorporated in their entirety herein:
U.S. Pat. No. 10,558,659 TECHNIQUES FOR DICTIONARY BASED JOIN AND AGGREGATION filed Mar. 8, 2019 by Albert Hopeman et al;
Oracle Database, Database Data Warehousing Guide, PART NO E85643-03, January 2018 available at https://docs.oracle.com/en/database/oracle/oracle-database/12.2/dwhsg/database-data-warehousing-guide.pdf

FIELD OF THE INVENTION

The present invention relates to acceleration of multidimensional analytics. Herein are database techniques that automatically retrofit a hardware-accelerated view onto a legacy query.

BACKGROUND

Online analytical processing (OLAP) provides multidimensional querying such as for reporting, data mining, data science, and business intelligence. Multidimensional axes of OLAP may be classified as (a) dimensions based on dimension tables that provide specification data such as read only data and (b) measures based on fact tables that provide time series data or mutable data such as from online transactional processing (OLTP).

Multidimensional axes may be interrelated such as with primary and foreign key columns specified in a relational schema. Within the relational schema, such interrelations may provide topological patterns such as, in order of increasing complexity, tree, star, and snowflake. A database view may rely on underlying base tables that are logically arranged in those topological patterns. During query execution, relational joins such as equijoins are used to navigate between multiple base tables and according to those topological patterns.

Analytic views (AVs) are database objects that encapsulate a logical business model over a relational model provided by tables and other database views. AV metadata identifies dimensions, hierarchies, and measures, including interrelated columns such as primary and foreign keys. Metadata defined in an AV allows a database system to analyze various topological roles that base tables and columns fulfil in the models. AVs present a fully-solved set of rows and columns. In other words, all aggregations are specified within the AV metadata defining the business model.

Attribute dimension objects are defined on dimension tables to define levels in dimension(s) and designate columns that demark those levels. Hierarchies are defined on attribute dimensions, defining the parent-child relationship among a set of levels of a same dimension. AVs are defined over a set of attribute dimensions and hierarchies and fact table(s), and additionally define measures over numeric fact columns.

AVs can be queried in structured query language (SQL) using AV specific syntax SQL extensions such as in a proprietary SQL dialect. One significant issue with this is that few or none of existing reporting tools generate SQL using AV specific extensions. There is also no expectation that providers of these legacy tools will devote redevelopment resources to use AV specific extensions in the future. Such legacy tools speak in the language of only standard SQL, using GROUP BY and aggregation operators to display aggregate results. A typical query from a reporting tool is of the following example form.

```
SELECT
    <group by columns>,
    <aggr_function1>(<measure column1>),
    <aggr_function2>(<measure column2>),
    ...
    <aggr_functionN>(<measure columnN>)
FROM
    <sources>
[ WHERE <filter before aggregation> ]
GROUP BY
    <group by columns>
```

Whereas a possibly semantically equivalent example AV SQL query instead has the following different form.

```
SELECT
    {attributes},
    {base measures defined in AV},
    {calcs defined in AV}
FROM
    {AV} HIERARCHIES ({hierarchies, ...})
WHERE <filters on hierarchies> ]
```

Given availability of schematic details represented by an AV based on the metadata that identifies dimensions, measures, dimension tables, fact tables, and hierarchy levels for dimensions, a database system has optimizations to apply to queries written against AVs. A technical problem is that leveraging AVs requires a developer to manually reauthor and regenerate their legacy queries against the AVs rather than the base tables. Existing legacy installations may include a library of many queries, and modifying all of those queries to utilize AVs may be costly or impractical. Furthermore, legacy queries may have been generated by multiple query tools, and each would need to be retargeted to the AVs. Worse still, users of an existing data model are likely familiar with names of queried tables, and may not know how or what to query with AVs.

DETAILED DESCRIPTION

Figure 1:
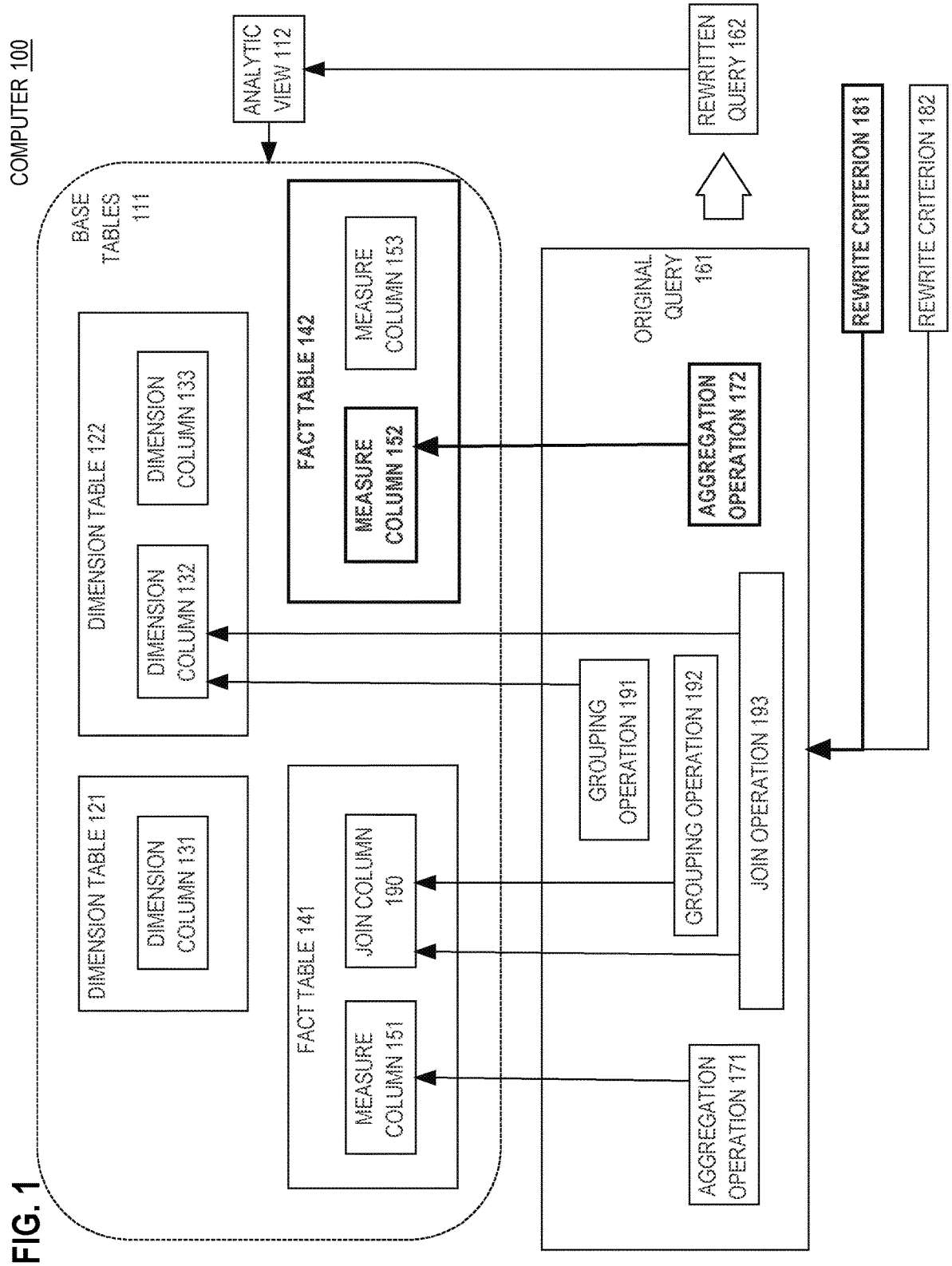
FIG. 1 is a block diagram that depicts an example computer that automatically retrofits an accelerated view onto a multidimensional query such as a legacy query for online analytical processing (OLAP)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are approaches for acceleration of multidimensional analytics, including database techniques that automatically retrofit a hardware-accelerated view onto a legacy query. Query transformations herein not only allow a broader set of legacy tools access to the benefits of multidimensional views known as analytic views, but does so without a client developer having to modify any queries. Acceleration herein of legacy and/or ad hoc queries requires only metadata changes to a legacy database and no changes to legacy clients.

Techniques herein may automatically analyze and transparently leverage semantic modeling provided by analytic views. For example, Oracle's Autonomous Data Platform autonomously creates analytic views that are built over legacy base tables.

Herein, an analytic view can be marked as eligible for use in novel query transformations such that a query, as originally submitted by a legacy tool without any knowledge of the analytic view, expressly and directly selects content from base tables. The analytic view has a rich semantic model and implementation logic that can detect that an ad hoc structure query language (SQL) GROUP BY query matches the analytic view's semantic model and responsively transforms the query into a faster query against the analytic view. The analytic view's implementation logic can detect a specific class of queries that can be represented and efficiently executed with the semantic model.

Once the query is transformed into a faster query against the analytic view, many performance benefits are realized. These performance benefits include, but are not limited to, join elimination and aggregation caching.

Herein are two kinds of complementary transformations. One transformation entails automatically rewriting a legacy query to use an automatically selected analytic view instead of base tables originally referenced by the query. The other kind of transformation herein is a so-called base table transform that, after a legacy ad hoc query is dynamically retargeted to an analytic view, the query is selectively further retargeted to directly use base tables and special structures associated with base tables in ways that the original legacy query was not designed for and, without awareness of proprietary syntax, could never expressly use.

Such query transformations can be applied to a lexical block of a query or set of lexical blocks that is a portion of the overall query. To accelerate the transformation itself, only the lexical block pertaining to the GROUP BY is transformed to use the base tables and associated structures in novel ways.

In an embodiment, a client need only execute a new clause in a data definition language (DDL) CREATE statement to cause some or all existing queries on the base tables to become candidates for automatic transformation. During query processing, base table references are checked to see if there are any transform-enabled AVs defined on them. If there are, transformation to a candidate AV occurs such that the query is rewritten to query the AV. If the transform cannot be applied for any candidate AVs, the query processing continues as normal without such transformation and without including the AV in the query plan.

Aggregations may be defined and/or performed within the AV, and the performance benefits of the AV are realized. For example, base table transform lets users define and benefit from AVs via a much larger set of tools and applications than would otherwise be possible. Base table transform further lets users with existing libraries of queries realize these benefits without any modifications to those libraries.

In an embodiment, execution of a query rewritten for an AV is treated as a view expansion, except that the view expanded data manipulation language (DML) is dynamically generated. AV implementation logic uses its rich metadata within the context of the query to generate optimal SQL, facilitating maximal leveraging of other database features such as vector transform, group by, and specialized caching as presented herein. The performance benefits of AVs include, but are not limited to:

A metadata-driven (rather than cost driven) approach to vector transform (VT). VT is a cost-based query transform that works on SQL queries that perform joins followed by aggregation. VT is designed to optimize analytic queries, specifically those typical against a star or snowflake schema. These queries often have a very large fact table joined to one or more small dimension tables, and perform aggregation of fact columns, often grouped by columns from the dimension tables. Typically, there is a very large number of input rows available for aggregation and a small number of output rows. To accurately engage VT in other approaches, the optimizer must correctly identify those characteristics using statistics. Whereas herein, metadata contained in an AV provides precise details of the fact, dimensions, and aggregation, which dramatically eases the optimizer's job in correctly applying VT.

Single pass aggregation. In many cases queries span levels of a hierarchy of a dimension, including cases of calculations such as rolling up and drilling down. With AV implementation logic, the hierarchical work is done in a way that includes optimal aggregation such that multiple rows get aggregated to a single parent item in a higher level, and subsequently aggregation is repeated to levels further up in the same dimension if needed.

Automatic caching of aggregate values and hierarchy structures. The AV tracks accesses based on hierarchy levels and provides the ability to automatically identify and cache frequently accessed areas of the aggregate space.

Optimized access of remote data. When the AV is mapped over remote tables in other databases and/or hosts, such as through a database symbolic link, AV implementation logic detects when it is more efficient to use data locally cached or push joins and aggregation to the source database.

As discussed later herein, base tables of an AV may be used as organizing tables, such as a fact table or a dimension table, whose rows can be dynamically organized during data analytics according to organizing operations such as aggregation operations such as with SUM such as for a measure column of a fact table, grouping operations such as group by or order by or distinct such as for binning rows of a fact table according to a foreign key that cross references rows of a dimension table, and join operations such as an equijoin of a fact table with a dimension table.

Herein, an organizing operation may specify an organizing operator such as SUM and at least one organizing column such as a measure column of a fact table. That is, an organizing operation may specify applying a particular organizing operator to particular organizing column(s) of organizing table(s). Details of those various organizing elements are discussed later herein such as for acceleration.

In an embodiment, a computer stores metadata that defines an analytic view that is based on organizing operation(s) that respectively specify organizing column(s) of organizing table(s), including a join operation that specifies a dimension column of a dimension table and a join column of a fact table. An original query is received that does not reference the analytic view. The original query specifies at least one organizing operation that is identical, somewhat similar, or compatible to an organizing operation that the analytic view is based on. Based on that at least one organizing operation that the original query specifies and the metadata that defines the particular analytic view, the original query is determined to satisfy rewrite criterion(s). In response to determining that the original query satisfies the rewrite criteria, a rewritten query that references the analytic view is generated based on the original query that does not reference the analytic view.

In an embodiment, the computer decides, without costing nor thresholding, to generate or reuse a dense key, for an organizing column of an organizing table, that an organizing operation specified in the metadata of the analytic view will use. In an embodiment, the dense key is stored in a columnar vector such as in volatile memory such as for special hardware processing such as with single instruction multiple data (SIMD) or a graphical processing unit (GPU). In an embodiment, generating the rewritten query that uses the analytic view entails embedding optimizer hints into the rewritten query to cause unconditional use of the dense key and/or vectorization.

1.0 Example Computer

FIG. 1 is a block diagram that depicts an example computer 100, in an embodiment. Computer 100 automatically retrofits an example analytic view 112 onto an example original query 161 such as a legacy multidimensional query for online analytical processing (OLAP). Computer 100 may be at least one rack server such as a blade, a personal computer, a mainframe, a virtual computer, or other computing device. When computer 100 comprises multiple computers, the computers are interconnected by a communication network.

Computer 100 provides access to a database (not shown) that is a bulk datastore such as a relational database. The database may be managed by software such as an application or middleware such as a database management system (DBMS). Data stored in the database may reside in volatile and/or nonvolatile storage.

Data is organized as tables that contain rows and columns in the database such as base tables 111 that includes tables 121-122 and 141-142. For example, base tables 111 may be defined in a relational schema that is stored in a database dictionary that defines the database.

In operation, computer 100 may receive original query 161 to analyze and/or retrieve data from some or all of base tables 111. Which of base tables 111 does original query 161 access depends on the scope of original query 161 such as according to the following example scenarios A-B that are respectively narrow and broad as discussed later herein.

In various embodiments, original query 161 is expressed as data manipulation language (DML) such as a create read update delete (CRUD) statement or query by example (QBE). For example, original query 161 may be a structured query language (SQL) DML statement such as a query. In an embodiment, original query 161 is received through open database connectivity (ODBC).

Original query 161 may contain references to tables and/or columns of base tables 111. In scenario A, original query 161 references only a minimum of components in base tables 111. As discussed later herein, scenario B is expansive and, according to the richness of OLAP, may access any of base tables 111 and their columns 131-133, 151-153, and 190.

As discussed later herein, base tables 111 may be used as organizing tables, such as a fact table or a dimension table, whose rows can be dynamically organized during data analytics according to organizing operations such as aggregation operations such as with SUM such as for a measure column of a fact table, grouping operations such as group by or order by or distinct such as for binning rows of a fact table according to a foreign key that cross references rows of a dimension table, and join operations such as an equijoin of a fact table with a dimension table.

Herein, an organizing operation may specify an organizing operator such as SUM and at least one organizing column such as a measure column of a fact table. That is, an organizing operation may specify applying a particular organizing operator to particular organizing column(s) of organizing table(s). Details of those various organizing elements are discussed later herein such as for acceleration.

1.1 Fact Table, Measure Column, and Statistics

For demonstration, scenario A introduced above is streamlined to isolate especially interesting features based on rewrite criterion 181 as applied solely to aggregation operation 172 that processes measure column 152 of fact table 142, all shown in bold. Some components not shown in bold are absent or unused in scenario A that operates as follows.

For example in scenario A, original query 161 may be SQL such as SELECT SUM(MEASURE_COLUMN152) FROM FACT_TABLE142. In this case, aggregation operation 172 is SUM(MEASURE_COLUMN152) that specifies applying SUM, which is an organizing operator, to measure column 152 that is an organizing column. For example, each row of fact table 142 may represent a respective billing line item whose price is stored in measure column 152. In that case, aggregation operation 172 calculates a billing total.

1.2 Analytic View

Although original query 161 seems straightforward in scenario A, execution of original query 161 may be accelerated by engaging analytic view 112 as follows even though original query 161 does not reference analytic view 112. For example if original query 161 is ad hoc, its author need not know that analytic view 112 exists. Likewise, original query 161 may be hardcoded in a legacy script or generated by a legacy tool, even if the script or tool preexists analytic view 112.

Defined in the database, such as in the form of metadata, is analytic view 112 that is backed by base tables 111. Analytic view 112 may be defined in a database dictionary such as by execution of data definition language (DDL) statement(s). In an embodiment, analytic view 112 is unmaterialized such that operation of analytic view 112 may entail accessing some or all of base tables 111. The definition of analytic view 112 contains metadata that specifies one or more organizing operations that includes a join operation between a fact table and a dimension table.

Metadata of an analytic view may provide definitions of various components, including a dimension definition, a measure by which to aggregate by one or more dimensions defined by the dimension definition. The dimension definition explicitly defines attributes of a dimension, and for each attribute, a specific name for the attribute and a specific source column in a source table that is the data source for the attribute.

A dimension definition may also specify a hierarchy between attributes of a same dimension, e.g. month is a child of quarter which is a child of year. The attributes of the respective source columns are referred to herein as being in the hierarchy.

The analytic view definition defines a source column of a source table for the measure, a name for the aggregation of the measure, and an aggregation operation (explicitly or implicitly) by which to aggregate the measure and one or more dimensions by which to aggregate. An analytic view definition also defines a join column in a source table for the measure and a join column of another source table for an attribute of a dimension. The source column for the measure may be referred to as a fact column.

With respect to an analytic view, a source table for a source column of a measure may be referred to herein as a base table for a base column. Similarly, a source table for a source column of a dimension attribute may be referred to herein as a base table for a base column.

Unlike materialized views, analytic views themselves are not materialized (not populated with data). A materialized view is defined by a database statement in the form of a query expression that projects columns, such as a SELECT FROM SQL statement. An analytic view is not defined by a query in this way. Furthermore, the dimensions by which data projected from a materialized view is defined by a grouping statement in the query, such as a GROUP BY statement. Dimensions are not defined this way in analytic view metadata. In any case, metadata that defines an analytic view, including components of the analytic view and organizing operations on those components, may be stored in a database dictionary such by executing DDL statements. Detailed approaches for defining and invoking an analytic view are presented in related non-patent literature Oracle® Database, DATABASE DATA WAREHOUSING GUIDE, Part No E85643-03, January 2018, the entire contents of which are incorporated herein by reference.

1.3 Rewrite Criteria

Before executing original query 161, computer 100 analyzes original query 161 to detect which base tables 111 and which organizing operations does original query 161 reference and how do those organizing operations correspond to identical, similar, or compatible organizing operations in the definition of analytic view 112. Such similarity or compatibility is discussed later herein. Such analysis of original query 161 is needed to decide whether or not execution of original query 161 may be adjusted to use analytic view 112. Only if original query 161 satisfies all applicable rewrite criteria 181-182 can execution of original query 161 be automatically adjusted to use analytic view 112.

In an embodiment, each of rewrite criteria 181-182 is a compound predicate that compares components of original query 161, such as organizing operations such as aggregation operations 171-172 and grouping operations 191-192 and/or join operation 193, to identical or similar organizing operations in the metadata definition of analytic view 112. Rewrite criteria 181-182 may also compare references, by original query 161 and by the definition of analytic view 112, to components of base tables 111 such as tables 121-122 and 141-142 and their columns 131-133, 151-153, and 190. For example, rewrite criterion 181 may verify that at least one of aggregation operations 171-172 references only measure column(s).

In scenario A, organizing operations 191-193 are absent from original query 161, and thus rewrite criterion 182 is shown not bold to indicate that rewrite criterion 182 is not applicable in scenario A and does not need to be satisfied. Only rewrite criterion 181 is shown in bold to indicate that scenario A need only satisfy rewrite criterion 181 to use analytic view 112 for execution of original query 161.

The database may contain various analytic views such as 112 that are backed by various sets of base tables that may or may not include any of tables 121-122 and 141-142. Based on rewrite criteria 181-182, computer 100 detects which of those views could be used to execute original query 161. Various example rewrite criteria are presented later herein.

In this example, analytic view 112 is automatically selected, based on rewrite criteria 181-182, for retargeting original query 161. Execution of original query 161 is based on analytic view 112 even though original query 161 does not reference analytic view 112 and instead references base tables 121-122. Execution of original query 161 through analytic view 112 is as follows.

The definition of analytic view 112 references base tables 111 in ways that may include organizing operation(s) such as aggregation operations 171-172 such as summary statistics such as averages or extremes or tallies such as counts or subtotals, groupings such as SQL GROUP BY or DISTINCT, and/or correlations such as joins of base tables. Original query 161 may specify same or somewhat different organizing operations. Rewrite criteria 181-182 are responsible for determining whether or not specified references and operations of analytic view 112 are the same or at least compatible with specified references and operations of original query 161 as explained later herein.

1.4 Query Plan

Using analytic view 112 to accelerate original query 161 that does not reference analytic view 112 entails automatically rewriting original query 161 to generate rewritten query 162 that does reference analytic view 112. Queries 161-162 may be operationally and/or syntactically different as is apparent in practical examples later herein. Likewise, respective query plans may be operationally and/or structurally different for queries 161-162 as shown later herein such that rewritten query 162 has the more efficient query plan, which provides acceleration in various ways as discussed later herein.

Intensive optimization may or may not be able to render both query plans equally efficient. However as discussed later herein, such intensive optimizing has overhead and latency of its own such that the query plan of rewritten query 162 should always execute somewhat or substantially faster because the query plan of rewritten query 162 is already more efficient, as discussed later herein, before optimizing and thus spends less time optimizing. In any case queries 161-162 and their respective query plans are semantically equivalent such that their results are identical or logically equivalent.

1.5 Group by, Order by, Distinct, and Join

In scenario B, original query 161 may specify organizing operation(s) such as 191-193 such as a SQL GROUP BY, ORDER BY, DISTINCT, and/or JOIN that are based on join column(s) such as 190 and/or dimension column(s) such as 131-133.

A join column is a column that participates in a join predicate of a relational join such as a primary key column and a foreign key column for an equijoin. A dimension column may be a join column. For example as shown: join operation 193 may specify a relational join; dimension column 132 may be a primary key of dimension table 122; and join column 190 may be a foreign key to correlate row(s) in fact able 141 to a row in dimension table 122. For example, dimension column 132 may contain unsigned integers such as a serial number that is devoid of semantics such as generated by a sequential counter to uniquely identify each row in dimension table 122.

Unlike a relational join that usually specifies only columns, other organizing operations may specify column(s) and/or calculations. As shown, grouping operations 191-192 may specify group by or order by. A group by or order by may specify a sequence of one or more dimension columns such as 131-133 and/or join column 190. Original query 161 may specify DISTINCT as an organizing operation that, as a modifier of a SQL SELECT, specifies one or more projection columns that may be dimension columns and/or measure columns. For example, analytic view 112 may accelerate execution when original query 161 is SELECT DISTINCT DIMENSION_COLUMN131 FROM DIMENSION_TABLE121 such as explained later herein.

1.6 Dense Key

Any of dimension columns 131-133 may be a key column such as a join key or a grouping key that serves as a key for various relational purposes such as join and group by. A foreign key such as join column 190 in fact table 141 may also be a join key or a grouping key. Regardless of whether a grouping key occurs in fact table 141 or dimension table 122 that is joined to fact table 141, the grouping key organizes rows of fact table 141 into groups.

With other approaches, query operations may entail direct or hashed usage of a join key or grouping key such as a primary key, a foreign key, a hashed join key, or a grouping key that is hashed or not. Hashing is prone to collisions when distinct values incidentally share a same hash code. Using raw values of such keys that are not hashed may entail sparse values such as text strings that are expensive to compare.

In any case hashed or not, sparse values or sparse hash codes are unsuited as array offsets because a range of distinct sparse values may contain large and/or many gaps that would greatly inflate the size of an array and leave much of the capacity of the oversized array unused. An array is important because it may provide randomly accessible organizing storage such as for a lookup table for joining or a histogram for grouping. Random access is important because it occurs in constant time.

Without an array, resolving a hash collision in a hash table needs linear time. Likewise, a hash function may generate codes that are more sparse even when original values are less sparse, which may be somewhat counterproductive. Techniques to reduce sparsity of hash codes, such as modulus, may increase collisions, which increases latency.

Without hashing and without collisions, techniques herein eliminate sparsity of a column for various organizing operations such as 171-172 and 191-193 by generating or reusing a dense key (not shown) that may be a dense grouping key and/or a dense join key for a grouping key column or a join key column as follows. For example, any of columns 131-133 and/or 190 may be a grouping key column for grouping rows of fact table 141 such as when joined to dimension table 122. A dense key is a generated sequence having a distinct unsigned integer for each distinct value in a key column such as a grouping key column or join key column, regardless of the scalar type of that column. In an embodiment, integer values of a dense key are entirely or mostly contiguous within a value range, even if the raw values in the column are noncontiguous.

In an embodiment, dense key generation may assign a next sequential unsigned integer each time a unique value in a key column is encountered such as during a table scan of dimension table 122 while executing original query 161 or a similar or different query whose execution does or does not use analytic view 112.

For example, values in dimension column 132 may be sparse such as text strings or integers of a discontinuous range. For example after filtration or joining, large and/or many gaps may arise in a previously contiguous set of distinct values from dimension column 132. A consequence of using a dense key is that gaps are removed such that a contiguous value range of a dense key is generated from a discontinuous original value range. Thus, dense key values may be used as array offsets for accelerated random access into a dense array.

In an embodiment, dense key generation scales horizontally such that multiple computational threads may in a thread safe and asynchronous way, for respective raw values: detect whether or not a dense key was already generated for a value, detect which of many threads should generate the dense key when both threads coincidentally encounter separate occurrences of a same value, and detect which respective contiguous dense key value each thread should generate next.

In an embodiment, dense grouping key values are generated as dictionary codes for an encoding dictionary being generated for a column. For example: dimension table 122 may be a product table; fact table 141 may store purchase order line items; and columns 132 and 190 may indicate a stock keeping unit (SKU). In that case, grouping operation 191 or 192 may specify grouping purchased items by product such as for reporting and/or calculating statistics.

For example, dimension table 121 may be a customer table, and original query 161 may ask for all customers that bought any of the top ten selling products with results grouped by product such that original query 161 references tables 121-122 and 141 and may use column 132 or 190 for grouping and/or filtering. If column 132 and 190 contain text strings, execution of original query 161 may be expensive because filtration of purchased items may entail an expensive string comparison for each row of tables 122 and 141 that may have millions of rows. Automation of computer 100 may accelerate original query 161 as follows.

Computer 100 may automatically detect that analytic view 112 provides the access and organization of base tables 111 that original query 161 needs. Original query 161 may be automatically rewritten to use analytic view 112 instead of directly referencing base tables 111. Such view usage implicitly includes, due to definition metadata of analytic view 112, using organizing operation(s) and/or dense key(s) that may cause acceleration as follows.

Using a dense key may facilitate integer comparisons instead of text string comparisons as originally expected by original query 161 such that a separate comparison for each row is accelerated by virtue of a faster scalar datatype. A dense key can be used as an array offset such as to randomly access a product row's SKU bin in constant time and without any comparison at all.

For example, comparing sparse key values may entail a branch instruction based on a condition code that is set by the comparison. Branching may invalidate a branch prediction, which may cause abandonment of a speculative execution. That may cause a stall of an instruction pipeline, which increases latency. Whereas using a dense key value as an array offset facilitates sorting rows of a base table into bins of respective SKUs without comparing and branching based on SKU because random access into an array does not need comparing and branching.

In an embodiment, a grouping key column or join key column may be dictionary encoded as a dense key when cached in volatile memory for analytic view 112 to leverage. For example, an array of bins used for grouping product rows of dimension table 122 may already be populated and cached in volatile memory such as by a previous query such that random access into the cached array occurs with almost no latency such that the cost of dense key generation and/or sorting into grouping bins may be amortized over many executions of same or different queries. In those ways, executing original query 161 based on analytic view 112 such as by automatic rewriting may accelerate original query 161 that originally did not reference analytic view 112. Detailed approaches for using a dense key to accelerate a query are presented in related U.S. Pat. No. 10,558,659 TECHNIQUES FOR DICTIONARY BASED JOIN AND AGGREGATION.

1.7 Acceleration

A database view is an infrastructural investment whose cost may be recouped by amortization through reuse of the database view. The definition of analytic view 112 contains static metadata such that accelerations and efficiencies designed into the definition of analytic view 112 are preserved and readily available for reuse, which is substantially different from an ad hoc query optimizer that is not expected to produce optimizations that survive after execution of a current query. Acceleration by analytic view 112 may be further contrasted with ad hoc optimization as follows.

Laziness may be an inescapable problem with ad hoc optimization that typically cannot be applied until a query is received. That is a problem because observable latency accrues when the query is received. Thus, any time spent optimizing query execution contributes directly to query latency.

Optimization heuristics may depend on content such as data value ranges and distributions such as cardinality of a table, selectivity of a column or predicate, and/or number of distinct values (NDV) in a column or satisfying a predicate. Whether based on scanning, input/output (I/O), and/or sampling, sudden collection of data statistics may impose much latency. Likewise, foregoing an optimization for lack of a readily available statistic may prevent some accelerations.

Excessive optimization latency may be mitigated by imposing an optimization deadline at which time optimization ceases. For example, time spent on optimization work in progress may be lost when optimization times out. Thus, optimization overhead may diminish or exceed acceleration from the optimization. Even when needed content statistics are timely generated or already available, statistical thresholds may be used to detect whether or not a particular optimization is appropriate. For example according to threshold(s), a column may have too many or too few distinct values for a given optimization.

Optimization may entail costing of alternative optimizations to select a best optimization. For example for a same query, an optimizer may generate hundreds or thousands of semantically equivalent and operationally distinct query plans to be cost compared. An inherent waste of such an approach is that all but one plan will be unused when discarded.

Analytic view 112 avoids such overhead and/or waste as follows. With various organizing operations such as for statistics and/or for joining or grouping as statically specified in the metadata definition of analytic view 112, some optimizations may be analyzed and/or incorporated when analytic view 112 is created and before original query 161 is received. Overhead of such optimization does not contribute to latency of original query 161.

For example, a decision to provide a dense grouping key for aggregation operation 171 such as for counting sales of each product occurs before receiving original query 161. For example when analytic view 112 is created, various acceleration data structures may be generated such as, for column 131-133 or 190, an index or an encoding dictionary, and some content statistics of base tables 111 may be collected such as in the background by a low priority thread. If analytic view 112 is materialized or cached, some costs incurred by an earlier query of analytic view 112 may be amortized, instead of repeated, with subsequent original query 161.

For example, it may be difficult and error-prone to automatically detect which content statistics will be needed for future ad hoc queries. For example, time and space of computer 100 may be wasted gathering statistics that will not be needed. Whereas analysis of the metadata definition of analytic view 112 may readily suggest dynamic statistics that will certainly or likely be used for optimization.

While other approaches may apply optimization based on costing and/or thresholds, static analysis of the metadata definition of analytic view 112 when analytic view 112 is created may detect optimizations that may be unconditionally applied when original query 161 is received or when analytic view 112 is created. Such unconditional optimizations are not based on costing nor thresholds. For example, deciding to generate, use, and/or retain for reuse a dense key may be unconditional based on the metadata definition of analytic view 112 such as according to organizing operations.

As discussed above, an organizing operation may specify grouping or joining of rows in base tables 111. Joins and especially equijoins may be important when analytic view 112 organizes multidimensional content. For example and although standard SQL does not have hierarchical views, analytic view 112 may define a content hierarchy such as a tree such as according to the master/detail pattern, a star with hub and spokes, or a snowflake. In an embodiment, any of those view topologies may be specified by analytic view 112 such as for OLAP and/or data mining of a data warehouse. A general discussion of OLAP and analytic views is provided later herein.

Legacy client tooling may submit to computer 100 rigid legacy multidimensional queries such as 161 against base tables 111 that computer 100 can accelerate by rewriting to retroactively exploit optimized analytic view 112. In that way, legacy multidimensional activities, even when performed by rigid and opaque client tools, such as for data mining, business intelligence, and reporting may be future proofed for innovative optimizations such as when analytic view 112 is created or refined to leverage new optimization techniques and mechanisms.

For example, legacy client tooling may become entrenched before analytic view 112 is created, and in that sense analytic view 112 is retrofitted. In an embodiment, analytic view 112 may be automatically generated such as by analyzing a historical log of queries, including original query 161 or not, that were applied to the database such as by legacy client tooling or ad hoc use.

In another example, analytic view 112 is expertly handcrafted by a database administrator (DBA) who understands the needs and usage patterns of legacy client tools. In any case and assuming that analytic view 112 already is available, a process for executing original query 161 based on automatically selecting analytic view 112 is as follows.

2.0 Example Automatic Engagement of a View

Figure 2:
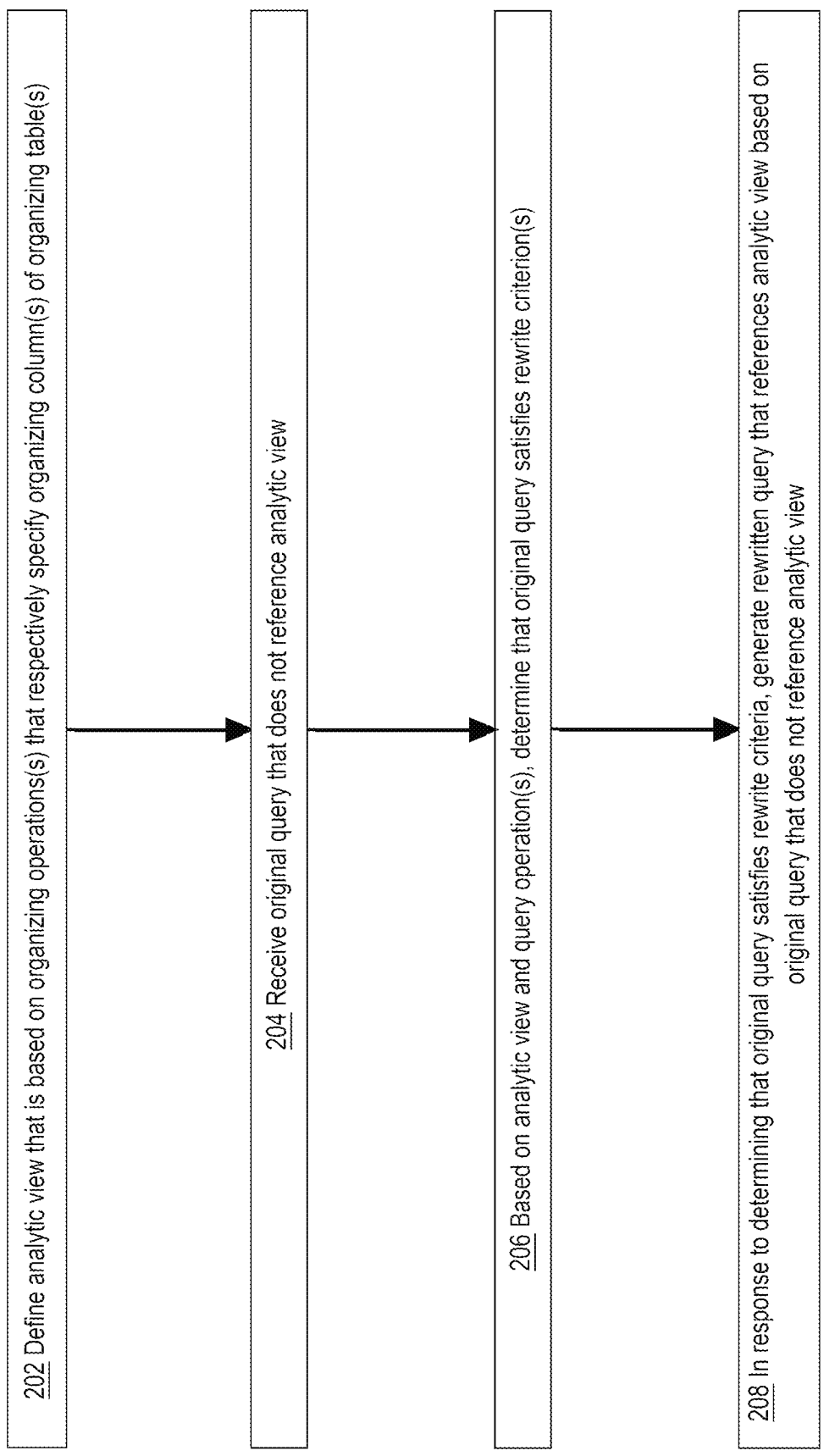
FIG. 2 is a flow diagram that depicts an example process that automatically retrofits an accelerated view onto a multidimensional query such as a legacy query for OLAP.

FIG. 2 is a flow diagram that depicts an example process that computer 100 may perform to automatically retrofit an accelerated view onto a multidimensional query such as a legacy query for OLAP. FIG. 2 is discussed with reference to FIG. 1.

Within a database during administration, step 202 stores metadata that defines analytic view 112, including metadata that defines and/or references components of analytic view 112 such as base tables 111 and organizing operations(s) that respectively specify organizing column(s) such as 131-133, 151-153, and 190 of organizing table(s) such as 121-122 and 141-142. For example, a DBA or the DBMS itself may submit a DDL CREATE statement to create analytic view 112. Several other DDL CREATE statements may necessarily precede a CREATE ANALYTIC VIEW statement such as follows. For example, step 202 may execute a DDL script that has various DDL CREATE statements that finally include a CREATE ANALYTIC VIEW statement that references and integrates schematic objects generated by the preceding DDL CREATE statements.

As explained earlier herein, multidimensional axes of OLAP may be classified as measures or dimensions. Each dimension used by an analytic view should preexist the analytic view such as by a respective CREATE ATTRIBUTE DIMENSION statement. To define each measure, the CREATE ANALYTIC VIEW statement may have a respective MEASURE clause that expressly or impliedly by default specifies an aggregation operation such as 171-172 for measurement mathematics such as SQL COUNT, COUNT DISTINCT, AVG, MAX, and SUM, especially for a measure column of a fact table.

In step 202, the DDL CREATE statements expressly or impliedly by default may expressly or impliedly specify various organizing operations to be applied to base tables 111 as discussed earlier herein. For example, an organizing operation may be configured to fulfil a SQL JOIN or GROUP BY clause that designates organizing column(s) such as 131-133, 151-153, and/or 190 as discussed earlier herein.

Rich analytic view topologies such as tree, star, or snowflake are composed of spokes or branches that may each be connected by a respective REFERENCES clause in the CREATE ANALYTIC VIEW statement. For example, such a REFERENCES clause may expressly or impliedly by default specify an organizing operation with join columns such as 190 and 132 as details of a relational join, especially for joining a fact table with a dimension table.

In another example a CREATE ATTRIBUTE DIMENSION statement designates dimension column 131 and expressly or impliedly by default specifies an organizing operation such as a SQL ORDER BY clause. In another example, measure column 151 is specified for a MEASURE, and the CREATE ANALYTIC VIEW statement contains an AGGREGATE BY clause that specifies a SQL GROUP BY clause based on join column 190 or dimension column 132 or 133. Detailed approaches for defining and invoking an analytic view are presented in related non-patent literature (NPL) DATABASE DATA WAREHOUSING GUIDE, Part No E85643-03.

At runtime, step 204 receives original query 161 that references some of base tables 111 but does not reference analytic view 112. For example and although analytic view 112 preexists runtime submission of original query 161, original query 161 may be a legacy query such that original query 161 was composed, or logic that generates original query 161 was developed, before analytic view 112 was created. In any case, original query 161 specifies organizing operation(s) that are identical, similar, or at least compatible with the organizing operation(s) that are specified in the metadata that defines analytic view 112. An example of a non-identical but compatible and somewhat similar organizing operation may be when both of original query 161 and analytic view 112 specify a respective group by such that one group by specifies a subset of organizing columns of the other group by.

Based on analytic view 112 and organizing operation(s) of original query 161, step 206 determines that original query 161 satisfies rewrite criterion(s) such as 181-182. Step 206 automatically decides that execution of original query 161 that does not reference analytic view 112 should be based on analytic view 112. Step 206 occurs without costing nor thresholding, depending on the embodiment. Multiple analytic views and/or other database views may be logically combined such as by stacking and/or composition. For example, a higher view may be stacked above two lower views that include analytic view 112 such that the lower views operate as base tables for the higher view.

Teaching herein that original query 161 does not reference analytic view 112 means that original query 161 does not expressly reference analytic view 112 and does not impliedly reference analytic view 112 by referencing a higher view that is directly or indirectly based on analytic view 112. For example, a top view, a middle view, and analytic view 112 as a bottom view may be stacked three views deep such that original query 161 does not reference any view in the stack that is or is above analytic view 112, because any such reference would directly or indirectly reference analytic view 112. Whereas if a lower view is beneath analytic view 112 in a stack of views, techniques herein are still applicable when original query 161 directly or indirectly references a lower view that analytic view 112 depends on. For example, any of base tables 111 may themselves be views that original query 161 expressly references, and techniques herein are still applicable.

In response to determining that original query 161 satisfies rewrite criteria 181-182, step 208 generates rewritten query 162 that references analytic view based on original query 161 that does not reference analytic view 112. For example based on rewritten query 162, a query plan may be generated that specifies accessing analytic view 112.

Depending on the scenario, step 208 may also execute rewritten query 162 such as follows.

In an embodiment, execution of rewritten query 162 directly operates analytic view 112. In an embodiment rewriting original query 161 may entail analyzing the metadata definition of analytic view 112 to decide which parts of rewritten query 162 should directly use analytic view 112 and which parts should instead bypass analytic view 112 to directly operate base tables 111 such as in ways not specified in original query 161. In one example, execution of rewritten query 162 includes sending a response for original query 161 that is based on use of analytic view 112 as discussed above. For example, the response may be serialized according to SQL and/or ODBC as a scalar value or a result set of row(s), depending on the nature of original query 161.

3.0 Example Acceleration Activities

Figure 3:
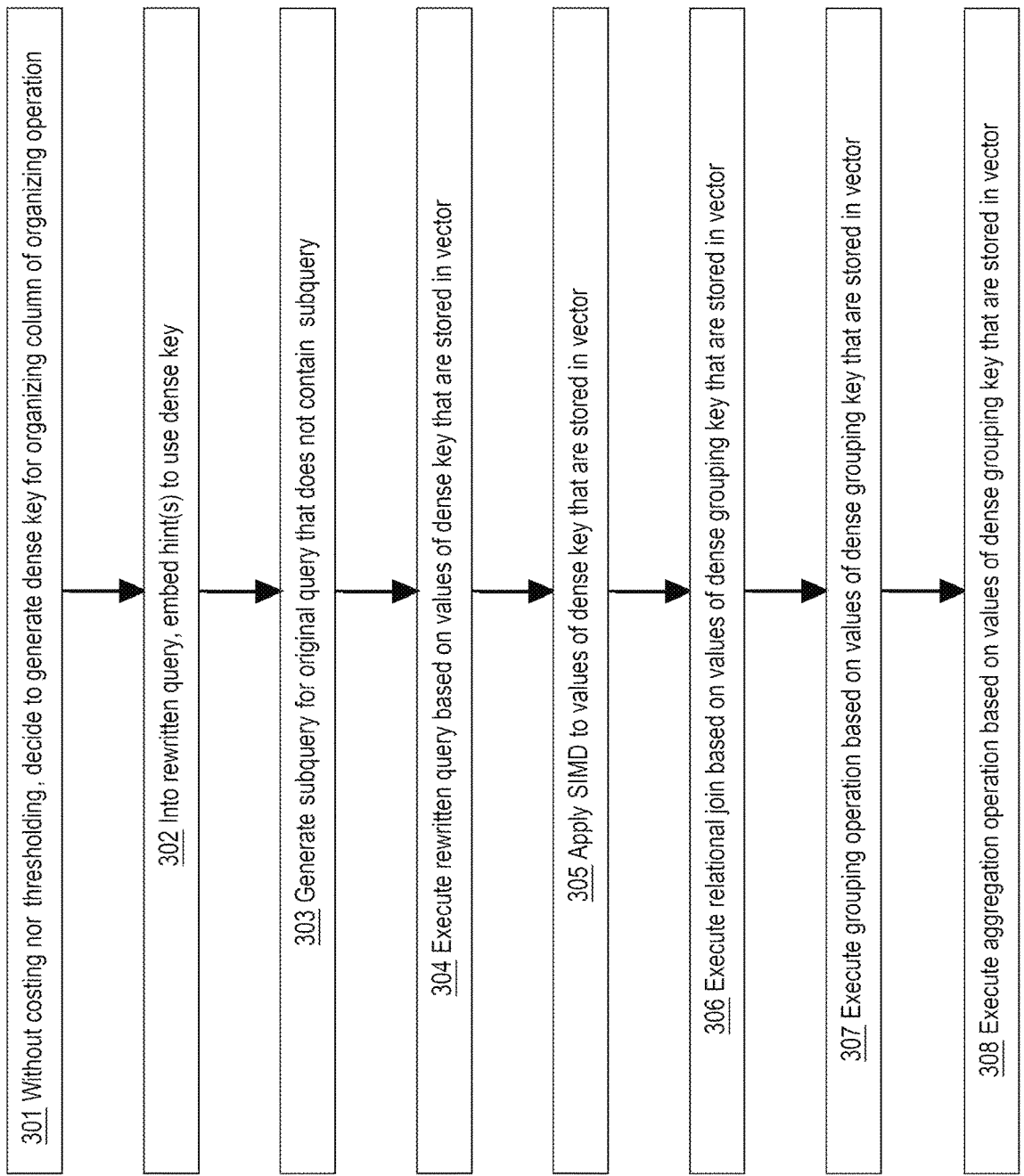
FIG. 3 is a flow diagram that depicts example activities for automatically accelerating a legacy query.

FIG. 3 is a flow diagram that depicts example acceleration activities that may occur while computer 100 executes original query 161. FIG. 3 is discussed with reference to FIG. 1. The features of the process of FIG. 3 demonstrate design choices, but not requirements, of computer 100.

The process of FIG. 3 occurs in two phases. The first phase is preparatory and entails activities such as planning, optimizing, hinting, and rewriting in steps 301-303. The second phase executes rewritten query 162 in steps 304-308 according to the preparations of the previous phase.

As explained earlier herein, a dense key provides random access of rows by a key column such as a grouping key or a join key without hashing nor collisions. For example, sparsity of column values may be eliminated for various operations such as organizing operations 171-172 and 191-193 by generating or reusing a dense key such as a dense grouping key or a dense join key. Without costing nor thresholding, step 301 decides to generate a dense key for an organizing column such as dimension column 132 as a primary key and/or join column 190 as a foreign key that may share a same dense encoding such as for accelerating an organizing operation. For example, the dense key may provide codes for an encoding dictionary that may be shared to encode one or both of columns 132 and 190 in volatile memory. Step 301 can reuse an existing dense key and/or encoding dictionary or generate new ones.

In an embodiment and with some analytical overhead, a query optimizer autonomously decides to use the dense key provided by step 301. In an embodiment, step 302 instead uses that dense key by embedding unconditional hint(s) into rewritten query 162. A query hint is a way to decorate, in line, a query with nonstandard directives to override default behaviors during query planning and/or plan optimization. For example, proprietary hints may be embedded into a SQL query.

Herein, hinting occurs after during or after rewriting so that some or all of the hint(s) may be directed to references introduced by the rewriting such as references to analytic view 112. However, much or most of the analysis needed for hinting occurs before runtime. With techniques herein, hinting is more efficient than plan optimization because hinting may be based on the schematic definition of analytic view 112 that is static and analyzed before runtime and with much less concern for analysis latency such as during administration or offline such as after hours. Unlike plan optimization, hinting occurs without costing nor thresholding, depending on the embodiment.

For modularity or necessity, rewritten query 162 may contain subquery(s). For example, a SQL SELECT may contain a nested SELECT. As shown later herein, rewritten query 162 may contain a subquery that encapsulates use of the dense key provided by step 301. For example, step 303 may generate a subquery inside rewritten query 162 even when original query 161 does not contain any subquery.

Rewriting may accommodate various concerns that each may be encapsulated into a separate respective subquery, which may or may not be nested. For example as shown later herein, even though original query 161 does not specify using analytic view 112, a dense key, nor a subquery, rewritten query 162 may contain a subquery that encapsulates accessing analytic view 112, and nested within that subquery may be another subquery that encapsulates use of a dense key that accelerates analytic view 112.

As explained earlier herein, use of a dense key may be accelerated by contiguously packing encoded key values into a columnar vector for various benefits such as compact and cache-optimal volatile storage such as for iterative processing such as in a small control loop. For example, a dense encoding of values of a table column that is a dense join key or a dense grouping key may be stored in a vector in volatile memory. Step 304 executes rewritten query 162 based on values of a dense grouping key or dense join key that are stored in a vector.

As explained earlier herein, a dense key is an alternate encoding of a column using integer values for efficiency such as for random access into an array. Integers of a dense key have a fixed width that facilitates packing according to a natural width of a machine word. For example, each such integers may have a same fixed width that is a half of a machine word, a whole machine word, or two machine words such that multiple integers may be contiguously stored with native machine alignment and without padding. For example, values from a dense key may be readily packed into a vector such as follows.

In an embodiment, values of a dense key such as join column 190 are separated into subsets that correspond to subsequences of rows of fact table 141, such as when a DBMS imposes a maximum physical vector size, such as when physical vectors are independent caching units such as with in-memory compression units (IMCU). For example, fact table 141 may contain two hundred rows such that join column 190 is loaded as a dense grouping key that contains two hundred integers. When a physical vector should store at most one hundred integers, two physical vectors may be needed to store that dense grouping key.

In other examples, parallel processing may need multiple physical vectors for a same dense key. In other examples, a physical vector may contain values of a dense key for join column 190 that, due to reordering or filtration, are not derived from a narrow subrange of rows of fact table 141. In any case, storing a dense key 170 into vector(s) may be caused as follows.

Hinting by step 302 as discussed earlier herein may include a hint that indicates that a dense grouping key or dense join key already is or should become stored in vector(s). Step 302 need not use costing nor thresholding to generate such a vector hint, depending on the embodiment. Dense key generation, including vector population, occurs as a reaction to the vector hint such that vectorization occurs without involvement nor overhead from a plan optimizer, thus providing further acceleration.

As explained earlier herein, acceleration may be based on data parallelism for simultaneous processing of multiple dense key values such as with single instruction multiple data (SIMD). Various accelerations may occur by processing a vector that contains a dense key using SIMD of an instruction set architecture (ISA) such as with a vectorized central processing unit (CPU) or a vector coprocessor such as a graphical processing unit (GPU).

Step 305 applies SIMD to values of a dense grouping key or dense join key that are stored in a vector such as when applying an organizing operation. For example, step 307 may execute grouping operation 191 or 192 by applying SIMD to a vector that contains a dense grouping key for column 132 or 190. In that way, multiple values of a dense key in a vector are simultaneously processed for inelastic horizontal scaling. In any case, a vectorized dense key may accelerate a grouping operation such as in step 307, a join operation such as in step 306, and/or an aggregation operation such as in step 308. Detailed approaches for vectorization to accelerate a query are presented in related U.S. Pat. No. 10,558,659 TECHNIQUES FOR DICTIONARY BASED JOIN AND AGGREGATION.

4.0 Additional Acceleration

Figure 4:
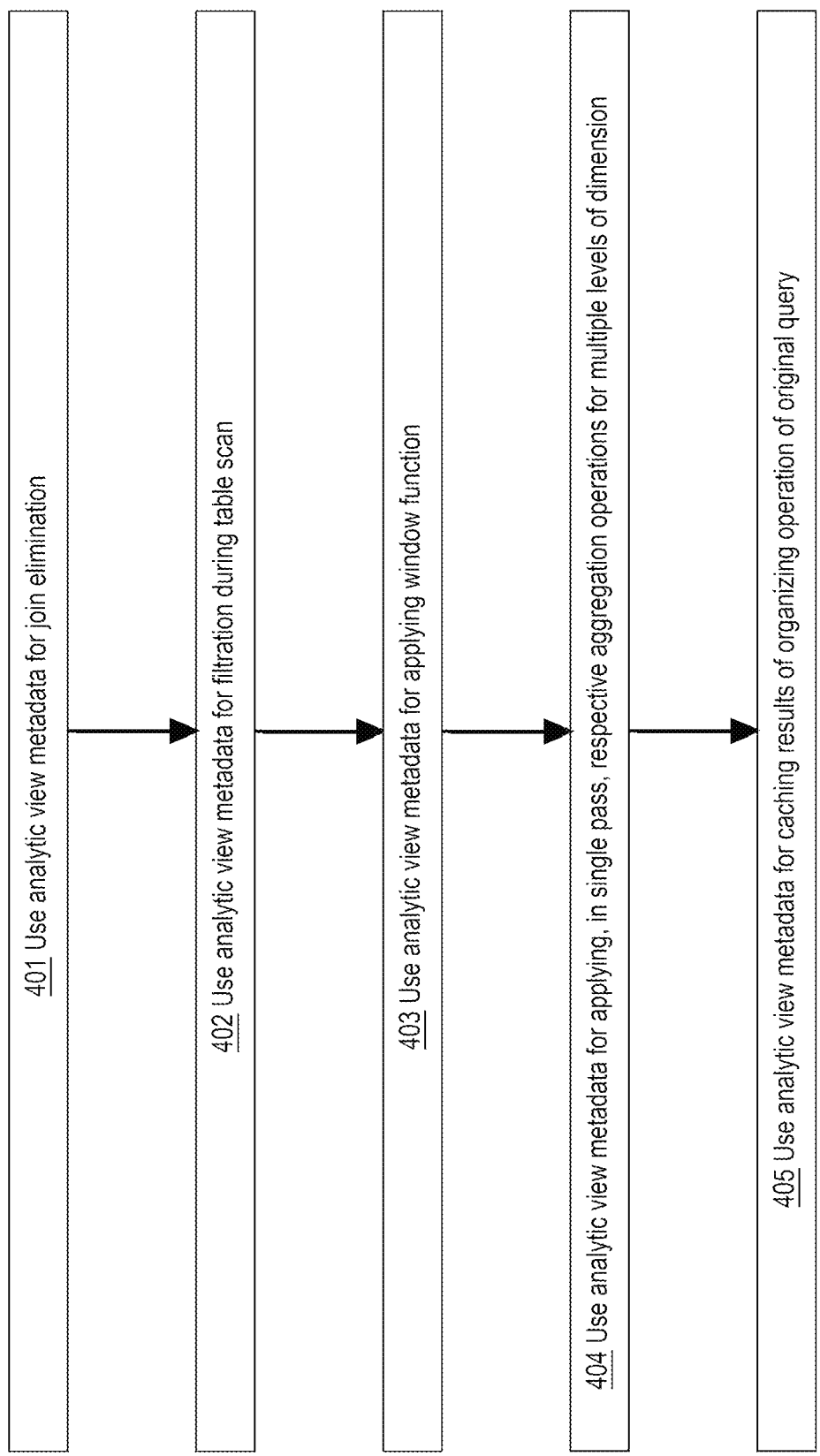
FIG. 4 is a flow diagram that depicts additional example activities for automatically accelerating a legacy query.

FIG. 4 is a flow diagram that depicts additional example acceleration activities, based on metadata that defines analytic view 112 and involving a fact table, that may occur while computer 100 executes original query 161. FIG. 4 is discussed with reference to FIG. 1. The features of the process of FIG. 4 demonstrate design choices, but not requirements, of computer 100.

Step 401 uses metadata that defines analytic view 112 for join elimination. For example, original query 161 may specify join operation 193 to join tables 122 and 144 so that aggregation operation 171 can calculate subtotals for measure column 151 in groups according to grouping operation 191 on dimension column 132 as inefficiently specified in original query 161. Join elimination in step 401 may, based on metadata that defines analytic view 112, may generate rewritten query 162 that specifies neither join operation 193 nor grouping operation 191 and instead specifies equivalent grouping operation 192 on join column 190. Thus, step 401 not only eliminates join operation 193 but also eliminates accessing at least dimension column 132 and possibly also dimension table 122.

As explained earlier herein, filtration may be an organizing operation such as with a predicate such as in a SQL WHERE clause. If rewritten query 162 is expressed entirely in terms of analytic view 112, ordering of query operations may be suboptimal such as when filtration is not applied until after view content is fully materialized. Also as explained earlier, herein are different kinds of query transformation that have different scopes and that may reorder query operations for efficiency.

For example, one kind of transform replaces direct access of base tables 111 by original query 161 with access instead through analytic view 112. Another kind of transform, known herein as base table transform, may occur after a legacy ad hoc query is dynamically retargeted to an analytic view, such that the query is selectively further retargeted, according to metadata that defines analytic view 112, to directly use base tables and special structures associated with base tables in accelerated ways. With base table transform, step 402 uses metadata that defines analytic view 112 for filtration during a table scan such as filtering on column 151 or 190 while scanning fact table 141, which may be before content of analytic view 112 is materialized.

Because of flexibility as to when filtration occurs, filtration may be performed by a filtration query operator that can be relocated within a query tree of a query plan such as during plan optimization. For example after generating an initial query plan, the filtration operator may be pushed down away from the root of a query tree and/or fused (i.e. combined) with another query operator such as a table scan operator. For example, filtration may be offloaded to a separate storage computer such as with a so-called smart scan.

Whether through base table transform or not, metadata that defines analytic view 112 may also be leveraged for query acceleration in the following additional ways. Step 403 uses metadata that defines analytic view 112 for applying a window function (a.k.a. analytic function). Similar to a grouping operator, a window function operates on subsets of rows. For example, step 403 may use metadata that defines analytic view 112 to generate or reuse a dense grouping key to accelerate a window function.

As explained earlier herein, attribute dimensions are defined on dimension tables to define levels in dimension(s) and designate dimension columns that demark those levels. Hierarchies are defined on attribute dimensions, defining the parent-child relationship among a set of levels of a same dimension. Likewise, analytic views are defined over a set of attribute dimensions and hierarchies.

A purpose of such a multilevel dimension may be to provide rollup for subtotaling a measure column of a fact table and drill down. For example, a fact table may have different foreign key columns for different levels of a same multilevel dimension for rollup and drill down, such as a time dimension with a day key, a week key, a month key, a calendar quarter key, and a year key. Inefficient rollup such as for subtotaling may finish summing at a lower level with one key before starting summing at a higher level with another key.

In other words, inefficient rollup may entail a separate pass for each level of the dimension. Step 404 instead uses metadata that defines analytic view 112 for applying, in a single pass, respective aggregation operations for multiple levels of a same dimension. For example even though a time dimension may have a day key column and a week key column that may inefficiently be subtotaled in two separate passes, step 404 instead subtotals by day in one pass and, without needing a second pass, arithmetically adds the day subtotals by week to calculate week subtotals.

Although analytic view 112 is unmaterialized by definition, some materialization may occur based on caching as follows. For example, results of joining, grouping, sorting, or filtering may be cached such as by individual row or individual column or by set of multiple rows or by segment of a column such as according to various horizontal or vertical slicing of tabular intermediate results. Step 405 uses metadata that defines analytic view 112 for caching results of organizing operation(s) of query 161 or 162 and/or reusing already cached intermediate results such as from previous queries.

For joining, grouping, and/or rollup, step 405 may use a cache that stores intermediate results of a particular level of a multilevel dimension, such as intermediate results of a lowest level such as a day level, or intermediate results of a highest level such as a year level, or intermediate results from an intermediate level such as a week level. A same cache may comingle intermediate results of different levels of a same or different dimensions.

5.0 Example Generated Artifacts

The following exemplary embodiment may be applied to data science for data mining of big data. The exemplary embodiment may integrate with any client tool that submits legacy online analytical processing (OLAP) queries. For example, the client tool may be any R data language studio that operates as a data science framework that executes R language scripts by generating OLAP queries that directly or indirectly access base tables instead of analytic views (AVs).

In some examples, a client tool indirectly accesses base tables through custom database views that are not AVs. For example, a client tool may be able to generate and query standard structured query language (SQL) views, which are highly restrictive such that view materialization, content mutation, and specialized aggregation within the view definition such as with ORDER BY are unsupported as non-standard.

Within an Oracle relational database management system (RDBMS), techniques herein automatically rewrite a legacy OLAP query to use AVs, vectorization, and/or special hardware such as single instruction multiple data (SIMD) and/or a graphical processing unit (GPU).

Although based on techniques presented earlier herein, the exemplary embodiment showcases design choices and enhancements that are not requirements of other embodiments herein. The exemplary embodiment is based on Oracle AVs and uses proprietary extensions to data definition language (DDL) of SQL. Legacy queries that use only standard SQL data manipulation language (DML) are accelerated, which may automatically engage rewriting to contain proprietary extensions to DML such as AV usage, vectorization, and/or proprietary hints to a query planner and/or query optimizer of an Oracle RDBMS for OLAP.

A practical AV may have many more dimensions, hierarchies, and measures than presented in the exemplary embodiment as specified below. In any case the following example DDL statements for defining an example AV provide an operative example for OLAP. The following example DDL statement creates an example dimension from a time dim base table.

```
CREATE OR REPLACE ATTRIBUTE DIMENSION time_attr_dim
USING time_dim
ATTRIBUTES
    (year_id,
     year_name,
     year_end_date,
     quarter_id,
     quarter_name,
     quarter_end_date,
     month_id,
     month_name,
     month_long_name,
     month_end_date)
LEVEL MONTH
    KEY month_id
    ALTERNATE KEY month_name
    MEMBER NAME month_name
    MEMBER CAPTION month_name
    MEMBER DESCRIPTION month_long_name
    ORDER BY month_end_date
    DETERMINES (quarter_id)
LEVEL QUARTER
    KEY quarter_id
    ALTERNATE KEY quarter_name
    MEMBER NAME quarter_name
    MEMBER CAPTION quarter_name
    MEMBER DESCRIPTION quarter_name
    ORDER BY quarter_end_date
    DETERMINES (year_id)
LEVEL YEAR
    KEY year_id
    ALTERNATE KEY year_name
    MEMBER NAME year_name
    MEMBER CAPTION year_name
    MEMBER DESCRIPTION year_name
    ORDER BY year_end_date;
```

The above example dimension declares multiple example levels that the following example DDL statement reifies with an example hierarchy.

```
CREATE OR REPLACE HIERARCHY time_hier
USING time_attr_dim
    (month CHILD OF
     quarter CHILD OF
     year);
```

The following example DDL statement defines an example analytic view that contains an example measure based on a sales fact base table as an example fact table.

```
CREATE OR REPLACE ANALYTIC VIEW sales_av
USING sales_fact
DIMENSION BY
    (time_attr_dim
                KEY month_id REFERENCES month_id
                HIERARCHIES (
                    time_hier DEFAULT)
    )
MEASURES
    (sum_sales FACT sales)
FACT COLUMNS (sales);
```

The following is an example ideal query against the above example AV.

```
SELECT
    time_hier.member_name AS time,
    sum_sales
FROM
    sales_av HIERARCHIES (time_hier)
WHERE
    time_hier.level_name = 'YEAR' AND
    time_hier.year_name IN ('CY2014','CY2015')
ORDER BY
    time_hier.hier_order;
```

Although the above example query is ideal due to its direct usage of the example AV, instead the following semantically equivalent query is originally submitted by a legacy tool that only accesses the base tables, which is less efficient because optimizations built into the example AV are otherwise unavailable without special techniques herein.

```
SELECT
    t.year_name AS time,
    SUM(f.sales) AS sales
FROM
    time_dim t,
    sales_fact f
WHERE
    t.month_id = f.month_id AND
    t.year_name IN ('CY2014','CY2015')
GROUP BY
    t.year_name
ORDER BY
    t.year_end_date;
```

The two example queries are asking the same question, but expressed in an entirely different way. In the example AV query, the predicate on the level name column indicates which groupings are desired whereas in the example legacy query that same information is specified via the GROUP BY.

Legacy queries undergo an automatic analysis phase where the SELECT, GROUP BY, and other clauses are examined to determine if the query can be transformed into an equivalent query on an AV. If the analysis indicates that the transformation can be applied, the query is modified accordingly to query the AV with the aggregations performed within the AV itself. If not, the query falls back to using base tables or views on which the AV is defined, in which case the AV is not involved in the execution plan. When the transform can be applied, the query can then realize all of the benefits outlined above for AV queries.

6.0 Example Validation

Obtaining performance benefits of the example AV entails adding the following final clause in bold to the end of the example AV definition.

```
CREATE OR REPLACE ANALYTIC VIEW sales_av
USING sales_fact
DIMENSION BY
      (time_attr_dim
              KEY month_id REFERENCES month_id
              HIERARCHIES (
                    time_hier DEFAULT)
      )
MEASURES
      (sum_sales FACT sales)
FACT COLUMNS (sales)
ENABLE QUERY TRANSFORM RELY;
```

That clause enables the AV to be a transform candidate for any queries on the base table in the USING clause of the AV itself and the USING clauses of the AV's associated attribute dimensions. AVs defined without this ENABLE clause are not considered as candidates for base table transform.

The following is an example syntax for enabling base table transform. To enable the base table transform, a new optional clause is introduced at the end of the analytic view DDL CREATE statement. This clause appears in bold immediately following the fact_columns clause. Such analytic view CREATE syntax is as follows.

```
av_create_stmt ::=
      CREATE [OR REPLACE] [{FORCE|NOFORCE}] ANALYTIC
      VIEW
analytic_view_name [sharing_clause] [classification_clause]
[using_clause] [dimension_by_clause] [measures_clause]
[default_meas_clause] [default_aggr_clause] [cache_clause]
[fact_columns_clause] [qry_transform_clause]
qry_transform_clause ::=
      ENABLE QUERY TRANSFORM [{RELY | NORELY}]
```

If the new clause is specified on an AV, then that AV is available when the RDBMS detects a query that matches an AV's semantic model and transforms the query if appropriate. If the clause is omitted, transform does not occur. The ENABLE clause may be forbidden on an AV under circumstances precluded by rewrite criteria such as:
  when the AV contains an attribute dimension for more than one dimension table (either a snowflake or starflake schema)
  when a dimension table joins to the fact table at a level that is above the leaf level of the dimension (i.e. a REFERENCES DISTINCT join for a 1-up mapping)
  when NORELY is specified and one or more base tables are remote tables.

The new clause allows for an optional RELY or NORELY keyword, with the default being NORELY. AV metadata can be viewed as a set of constraints on the underlying data. These constraints are not enforced by the database but can be checked using the built-in DBMS_HIERARCHY.VALIDATE_ANALYTIC_VIEW procedure.

For example, an analytic view is a composite of dimensions and measures in a semantic layer that, in turn, is a composite of tables and columns in a relational layer. Likewise as discussed earlier herein, analytic views and other views may be stacked. In any case an analytic view, as a composite of separately defined components, may be broken by DDL changes to underlying components.

In some cases, changes merely invalidate optimization that were incorporated into the metadata of the analytic view. For example, the analytic view may be compiled in a way that optimizes its metadata and/or inserts additional optimization metadata into the definition of the analytic view. In that case, recompilation of the analytic view may reoptimize and regenerate the analytic view's compiled metadata in a way that reflects changes to definitions of components that are underlie the analytic view, such as schematic changes to tables or columns such as when an index has been dropped that the analytic view's previous compilation leveraged.

In other cases, schematic changes to underlying components are so impactful that recompilation of the analytic view would or does fail, and the analytic view needs express redefinition such as by DDL alteration. In any case, there may be a loose coupling between metadata of the analytic view and metadata of underlying schematic components such that, without automatic enforcement of metadata consistency, the compiled and/or uncompiled metadata of the analytic view becomes invalid. In an embodiment, a need to revalidate analytic view metadata may be automatically tracked without actually causing or enforcing revalidation and/or recompilation.

In other words, analytic view metadata may eventually enter an ambiguous state such that the analytic view metadata may actually still be valid, but the database system integrity checks needed to prove such validity have not recently recurred. Mutually exclusive RELY and NORELY keywords configure how that ambiguous state affects query rewrite opportunities such as follows.

The RELY keyword indicates that the constraints implied on the data by the AV metadata can be relied on without validation when being considered for base table transform. If NORELY is specified, then the data must be in a valid state in relation to the metadata in order for the base table transform to take place. A new set of built-in DBMS_HIERARCHY procedures for tracking the validation state of an AV are as follows. The new clause is modeled after the syntax found in constraints.

The data dictionary views XXX_ANALYTIC_VIEWS expose this new metadata with three new columns:
  QUERY_TRANSFORM_ENABLED—Y or N depending on if the new clause is specified or not
  QUERY_TRANSFORM_RELY—Y or N depending on if RELY or NORELY is specified
  VALIDATE_STATE—VALID, NEEDS_VALIDATE, or ERROR depending on the state of the data.

Validation state is as follows. As mentioned above, the DBMS_HIERARCHY.VALIDATE_ANALYTIC_VIEW can be used to check if the constraints implied by the AV metadata are valid for the underlying data. In an embodiment, this procedure indicates whether or not any rows in the underlying data are invalid but will not monitor the validate_state after the call. The following two new procedures are added to DBMS_HIERARCHY for lifecycle management of dynamic validation state:

ENABLE_VALIDATE_TRACKING—turns on validation tracking for the given analytic view DISABLE_VALIDATE_TRACKING—turns off validation tracking for the given analytic view.

Both procedures expect a name of an AV to track and an optional AV owner. The new VALIDATE_STATE column in XXX_ANALYTIC_VIEWS will be set by default to NEEDS_VALIDATE when the AV is created. It will remain in this state until ENABLE_VALIDATE_TRACKING is called. Enabling tracking causes the following:

Calls to DBMS_HIERARCHY.VALIDATE_ANALYTIC_VIEW will change the state to VALID or ERROR depending on the results of the call. The state will not be changed if one or more tables:
is remote
has a VPD policy on it
DDL changes to the analytic view or dependent objects will cause the state to change back to NEEDS_VALIDATE
DML changes to the base tables of the analytic view will cause the state to change back to NEEDS_VALIDATE.

A call to DISABLE_VALIDATE_TRACKING also resets the state back to NEEDS_VALIDATE. Tracking remains disabled despite subsequent on-demand validation by calls to DBMS_HIERARCHY.VALIDATE_ANALYTIC_VIEW.

If base table transform is enabled with NORELY then the VALIDATE_STATE must be VALID for the transform to take place in one embodiment. Another embodiment may expose more fine-grained states of valid data such that the base table transform with NORELY will only transform when all constraints are satisfied for a particular query. For example, if a join to the PRODUCT dimension is invalid, but all other constraints are valid, and the query does not require the PRODUCT dimension then this query can still transform with NORELY.

7.0 Example Rewrite Criteria

Some embodiments may have the following example rewrite criteria that may be restrictions on transformation. Not all queries against base tables will transform to an AV query, even when the AV is enabled for transform. Only queries that match the semantic model of the AV are eligible for transform. A lexical block or blocks of a query should transform or not based on automatic detection of any of the following example contextual criteria for detecting rewrite eligibility:

The only SELECT statement clauses in the lexical blocks are SELECT, FROM, WHERE, GROUP BY, and/or HAVING. In an embodiment, other clauses such as PIVOT, UNPIVOT, CONNECT BY, and MODEL should not transform.

All of the FROM elements should be objects in the TABLE namespace and be either a source fact table or a source dimension table of the AV and should only appear at most once per instance in the AV definition.

If American National Standards Institute (ANSI) compliant joins are used, only INNER is allowed.

Joins between multiple databases should exactly match the joins specified in the AV definition.

The WHERE clause(s), if given, should be symmetric conditions across hierarchies a dimension of AV. For example, a join condition of the form (PROD_COLOR='RED' OR TIME_YEAR='2019') would not transform if PROD_COLOR and TIME_YEAR are from two different hierarchies.

The GROUP BY clause can only contain column references and each column referenced should be a source column for a dimension attribute in the AV. A column referenced by a GROUP BY clause is referred to herein as a group by column.

For each hierarchy participating in the GROUP BY, the set of grouping key columns for a single level in the hierarchy should be present in the GROUP BY. All other attributes of the hierarchy should be determined by the single level.

Each aggregation operator should take in a single column. That column should be a fact column of the AV. The aggregation operator should be one that is supported by AV base measures.

The transform can span multiple lexical blocks of the query so long as:
In the query parse tree, there is a single path up from each leaf lexical block to the lexical block containing the GROUP BY. For example, a WITH element that is referenced more than once would not be allowed. For example, if query parsing generates a logical graph, such as a directed acyclic graph (DAG), the GROUP BY clause still should parse as a logical subtree and not a subgraph.
Likewise, there is a single GROUP BY at the top-level lexical block being transformed. HAVING clauses that appear before the top-level GROUP BY are treated the same as WHERE clauses.
No analytic functions can appear before the top-level GROUP BY block.

With some rewrite criteria embodiments, SELECT DISTINCT is treated as if the lexical block has a GROUP BY with all the SELECT elements being in the GROUP BY clause. The top-level lexical block need not contain a GROUP BY if all the SELECT elements are aggregation functions. Other embodiments may relax some of the above example restrictions such that a larger set of queries can match the AV semantic model and properly transform.

In various embodiment, any of the following example rewrite criteria are tested for each particular analytic view of many analytic views when an original query is analyzed for possible rewriting:

a rewrite criterion that is satisfied only when all objects referenced by a SQL FROM clause of the original query are defined in a table namespace and referenced in metadata that defines the particular analytic view, a rewrite criterion that is satisfied only when all tables referenced by a SQL FROM clause of the original query are fact tables and dimension tables in one or more organizing tables that the particular analytic view is based on, a rewrite criterion that is satisfied only when the original query does not specify a particular join between two tables defined in separate respective databases unless one or more organizing operations that the particular analytic view is based on includes said particular join, a rewrite criterion that is satisfied only when the original query does not specify a join having a compound predicate that uses multiple dimension hierarchies, a rewrite criterion that is satisfied only when the original query does not contain a group by unless the group by specifies only dimension column(s) of one or more organizing columns that the particular analytic view is based on, a rewrite criterion that is satisfied only when the original query does not contain a group by that references different levels of a dimension hierarchy, a rewrite criterion that is satisfied only when the original query does not contain an aggregation operation that specifies more than one column, a rewrite criterion that is satisfied only when the original query does not contain an aggregation operation that specifies a column that is not a measure column of the organizing columns that the particular analytic view is based on, and a rewrite criterion that is satisfied only when the original query does not repeatedly reference a particular element of an SQL WITH clause.

8.0 Comparative Example with Query Plans

In a recent laboratory experiment, various legacy queries were each executed twice, including once with a respective AV available and once without. These queries come from several different tools and have a wide range of performance without the AV, including some that took several hundred seconds to execute. With the AV metadata available and leveraged as discussed earlier herein, all queries completed in under 2.5 seconds, and the overall average was sub-second execution.

The following example performance query as originally submitted by a legacy tool is examined in detail below.

```
SELECT
    "TIME_LB_DIM"."TIME_YEAR" AS "column0",
    "PROD_LB_DIM"."PROD_BUSINESS_LEVEL" AS "column1",
    "PROD_LB_DIM"."PROD_CATEGORY" AS "column2",
    "PROD_LB_DIM"."PROD_MARKET" AS "column3",
    "PROD_LB_DIM"."PROD_SECTOR" AS "column4",
    "PROD_LB_DIM"."PROD_SUB_SECTOR" AS "column5",
    "PROD_LB_DIM"."PROD_HO_BRAND" AS "column6",
    SUM("FSCU_FACT"."MI_EKA_1_2") AS "column7"
FROM
    "UWH"."FSCU_FACT" "FSCU_FACT"
        INNER JOIN "UWH"."GEOG_LB_DIM" "GEOG_LB_DIM"
            ON "FSCU_FACT"."GEOG_KEY" =
"GEOG_LB_DIM"."GEOG_SAP_SALES_CUSTOMER"
        INNER JOIN "UWH"."PROD_LB_DIM" "PROD_LB_DIM"
            ON "FSCU_FACT"."PROD_KEY" = "PROD_LB_DIM"."PROD_SAP_CODE"
        INNER JOIN "UWH"."TIME_LB_DIM" "TIME_LB_DIM"
            ON "FSCU_FACT"."TIME_KEY" = "TIME_LB_DIM"."TIME_DAY"
WHERE
    NOT ( "TIME_LB_DIM"."TIME_YEAR" IN ( 'UY2002' ) ) AND
    "GEOG_LB_DIM"."GEOG_NAT_CUSTOMER" IN (
        'AN102050100001697706_1',
        'AN102050100001697715_1',
        'AN102050100000008420_1',
        'AN102050100000008429_1',
        'AN102050100000008446_1',
        'AN102050100000008523_1',
        'AN102050100000008524_1',
        'AN102050100000029371_1',
        'AN102050100000266128_1',
        'AN102050100001697703_1') AND
    "PROD_LB_DIM"."PROD_BUSINESS_LEVEL" = 'PN002000000002_1' AND
    "PROD_LB_DIM"."PROD_CATEGORY" = 'PN557969212184_1' AND
    "PROD_LB_DIM"."PROD_MARKET" = 'PN902000000252_1' AND
    "PROD_LB_DIM"."PROD_SECTOR" = 'PN903000002217_1' AND
    "PROD_LB_DIM"."PROD_SUB_SECTOR" = 'PN002005000036_1' AND
    "PROD_LB_DIM"."PROD_HO_BRAND" = 'PN000001217035_1'
GROUP BY
    "TIME_LB_DIM"."TIME_YEAR",
    "PROD_LB_DIM"."PROD_BUSINESS_LEVEL",
    "PROD_LB_DIM"."PROD_CATEGORY",
    "PROD_LB_DIM"."PROD_MARKET",
    "PROD_LB_DIM"."PROD_SECTOR",
    "PROD_LB_DIM"."PROD_SUB_SECTOR",
    "PROD_LB_DIM"."PROD_HO_BRAND"
```

The following is an example explain plan for the above example performance query without engaging an AV.

| Operation | Cumulative Seconds | Rows |
|---|---|---|
| SELECT STATEMENT | 1 | 2 |
|   PX COORDINATOR | 1 | 2 |
|     PX SEND QC (RANDOM) | 1 | 2 |
|       HASH GROUP BY | 1 | 2 |
|         PX RECEIVE | 1 | 12 |
|           PX SEND HASH | 1 | 12 |
|             HASH GROUP BY | 1 | 12 |

| Operation | Cumulative Seconds | Rows |
|---|---|---|
| HASH JOIN | 1 | 58071 |
|   JOIN FILTER CREATE | 1 | 232K |
|     PX RECEIVE | 1 | 232K |
|       PX SEND BROADCAST | 1 | 232K |
|         VIEW | 1 | 58071 |
|           HASH GROUP BY | 1 | 58071 |
|             PX RECEIVE | 1 | 104K |
|               PX SEND HASH | 1 | 104K |
|                 HASH GROUP BY | 293 | 104K |
|                   NESTED LOOPS | 293 | 2M |
|                     PX RECEIVE | 293 | 1M |
|                       PX SEND BROADCAST | 293 | 1M |
|                         MERGE JOIN CARTESIAN | 293 | 270K |
|                           TABLE ACCESS INMEMORY FULL | 293 | 1480 |
|                           BUFFER SORT | 293 | 270K |
|                             PX BLOCK ITERATOR | 1 | 731 |
|                               TABLE ACCESS INMEMORY FULL | 1 | 731 |
|                     PX BLOCK ITERATOR | 293 | 2M |
|                       TABLE ACCESS INMEMORY FULL | 294 | 2M |
|   JOIN FILTER USE | 1 | 108K |
|     PX BLOCK ITERATOR | 1 | 108K |
|       TABLE ACCESS INMEMORY FULL | 1 | 108K |

When base table transform occurs, the example performance query is rewritten as the following transformed query against the AV.

```
select
    "MyProject_TIME_YEAR_AD#MyProject_TIME_YEAR_HIER#TIME_YEAR_ATTR" "column0",
    "MyProject_PROD_TOTAL_PRODUCT_AD#MyProject_ATTRHIER_PROD_BUSINESS_LEVEL_HIER#PROD_BUSINESS_LEVEL_ATTR" "column1",
    "MyProject_PROD_TOTAL_PRODUCT_AD#MyProject_PROD_TOTAL_PRODUCT_HIER#PROD_CATEGORY_ATTR" "column2",
    "MyProject_PROD_TOTAL_PRODUCT_AD#MyProject_PROD_TOTAL_PRODUCT_HIER#PROD_MARKET_ATTR" "column3",
    "MyProject_PROD_TOTAL_PRODUCT_AD#MyProject_PROD_TOTAL_PRODUCT_HIER#PROD_SECTOR_ATTR" "column4",
    "MyProject_PROD_TOTAL_PRODUCT_AD#MyProject_PROD_TOTAL_PRODUCT_HIER#PROD_SUB_SECTOR_ATTR" "column5",
    "MyProject_PROD_TOTAL_PRODUCT_AD#MyProject_PROD_TOTAL_PRODUCT_HIER#PROD_HO_BRAND_ATTR" "column6",
    "MEASURES#MI_EKA_1_2" "column7"
from
    (select
        "MyProject_PROD_TOTAL_PRODUCT_AD"."MyProject_PROD_TOTAL_PRODUCT_HIER"."PROD_HO_BRAND_ATTR"
            "MyProject_PROD_TOTAL_PRODUCT_AD#MyProject_PROD_TOTAL_PRODUCT_HIER#PROD_HO_BRAND_ATTR",
        "MyProject_PROD_TOTAL_PRODUCT_AD"."MyProject_PROD_TOTAL_PRODUCT_HIER"."PROD_SUB_SECTOR_ATTR"
            "MyProject_PROD_TOTAL_PRODUCT_AD#MyProject_PROD_TOTAL_PRODUCT_HIER#PROD_SUB_SECTOR_ATTR",
        "MyProject_PROD_TOTAL_PRODUCT_AD"."MyProject_PROD_TOTAL_PRODUCT_HIER"."PROD_SECTOR_ATTR"
            "MyProject_PROD_TOTAL_PRODUCT_AD#MyProject_PROD_TOTAL_PRODUCT_HIER#PROD_SECTOR_ATTR",
        "MyProject_PROD_TOTAL_PRODUCT_AD"."MyProject_PROD_TOTAL_PRODUCT_HIER"."PROD_MARKET_ATTR"
            "MyProject_PROD_TOTAL_PRODUCT_AD#MyProject_PROD_TOTAL_PRODUCT_HIER#PROD_MARKET_ATTR",
        "MyProject_PROD_TOTAL_PRODUCT_AD"."MyProject_PROD_TOTAL_PRODUCT_HIER"."PROD_CATEGORY_ATTR"
            "MyProject_PROD_TOTAL_PRODUCT_AD#MyProject_PROD_TOTAL_PRODUCT_HIER#PROD_CATEGORY_ATTR",
"MyProject_PROD_TOTAL_PRODUCT_AD"."MyProject_ATTRHIER_PROD_BUSINESS_LEVEL_HIER"."PROD_BUSINESS_LEVEL_ATTR"
"MyProject_PROD_TOTAL_PRODUCT_AD#MyProject_ATTRHIER_PROD_BUSINESS_LEVEL_HIER#PROD_BUSINESS_LEVEL_ATTR",
        "MyProject_TIME_YEAR_AD"."MyProject_TIME_YEAR_HIER"."TIME_YEAR_ATTR"
            "MyProject_TIME_YEAR_AD#MyProject_TIME_YEAR_HIER#TIME_YEAR_ATTR",
        "MyProject_TIME_YEAR_AD"."MyProject_TIME_YEAR_HIER"."TIME_DAY_ATTR"
            "MyProject_TIME_YEAR_AD#MyProject_TIM E_YEAR_HIER#TIME_DAY_ATTR",
        "MyProject_PROD_TOTAL_PRODUCT_AD"."MyProject_PROD_TOTAL_PRODUCT_HIER"."PROD_SAP_CODE_ATTR"
            "MyProject_PROD_TOTAL_PRODUCT_AD#MyProject_PROD_TOTAL_PRODUCT_HIER#PROD_SAP_CODE_ATTR",
        "MEASURES"."MI_EKA_1_2" "MEASURES#MI_EKA_1_2"
    from
        analytic view (
            using "UWH"."MyProject_AV_FSCU_FACT_AV"
            hierarchies (
                "MyProject_PROD_TOTAL_PRODUCT_AD"."MyProject_PROD_TOTAL_PRODUCT_HIER",
                "MyProject_PROD_TOTAL_PRODUCT_AD"."MyProject_ATTRHIER_PROD_BUSINESS LEVEL_HIER",
                "MyProject_TIME_YEAR_AD"."MyProject_TIME_YEAR_HIER"
            )
            filter fact (
                "MyProject_GEOG_CUST_CONTACT_AD"."MyProject_ATTRHIER_GEOG_NAT_CUSTOMER_HIER" to (
                    "DEPTH" =1
                    and
```

```
            "GEOG_NAT_CUSTOMER_ATTR" in (
                'AN102050100001697706_1',
                'AN102050100001697715_1',
                'AN102050100000008420_1',
                'AN102050100000008429_1',
                'AN102050100000008446_1',
                'AN102050100000008523_1',
                'AN102050100000008524_1',
                'AN102050100000029371_1',
                'AN102050100000266128_1',
                'AN102050100001697703_1')
        ),
        "MyProject_PROD_TOTAL_PRODUCT_AD"."MyProject_PROD_TOTAL_PRODUCT_HIER" to (
            (((("DEPTH" = 6 and
            "PROD_CATEGORY_ATTR" = 'PN557969212184.1')
            and
            "PROD_MARKET_ATTR" = 'PN902000000252.1')
            and
            "PROD_SECTOR_ATTR" = 'PN903000002217.1')
            and
            "PROD_SUB_SECTOR_ATTR" = 'PN002005000036.1')
            and
            "PROD_HO_BRAND_ATTR" = 'PN000001217035.1'
        ),
        "MyProject_PROD_TOTAL_PRODUCT_AD"."MyProject_ATTRHIER_PROD_BUSINESS_LEVEL_HIER" to (
            "DEPTH"= 1
            and
            "PROD_BUSINESS_LEVEL_ATTR" = 'PN002000000002_1'
        ),
        "MyProject_TIME_YEAR_AD"."MyProject_TIME_YEAR_HIER" to (
            "DEPTH" = 1 and
            "TIME_YEAR_ATTR" != 'UY2002'
        )
    )
) "AV"
where
    (("MyProject_PROD_TOTAL_PRODUCT_AD"."MyProject_PROD_TOTAL_PRODUCT_HIER"."DEPTH" = 6
    and
    "MyProject_PROD_TOTAL_PRODUCT_AD"."MyProject_ATTRHIER_PROD_BUSINESS_LEVEL_HIER"."DEPTH" = 1)
    and
    "MyProject_TIME_YEAR_AD"."MyProject_TIME_YEAR_HIER"."DEPTH" = 1)
) "FSCU_FACT"
```

All aggregations and joins are contained within the AV in the above transformed query. The depth predicates identify the level at which aggregates are desired. The columns in the GROUP BY of the original query are analyzed to determine which levels they identify, based on the level key/alternate key metadata in the associated attribute dimensions of the AV.

AVs present a fully-solved space such that any predicates applied over them are applied over the aggregation. The FILTER FACT clause allows predicates to be specified that are applied before aggregation, matching the semantics of a WHERE clause at or below the lexical block containing a GROUP BY. As explained earlier herein, filtration before aggregation provides much flexibility such that: filtration may be automatically relocated within a query parse tree such as pushed down closer to the leaves of the tree; a filtration operator may become fused with a relational operator that is adjacent to the filter operator; and filtration may be offloaded to a storage computer such as with a smart scan.

After the transform is applied, the AV will then go through view expansion and dynamically generate SQL. The following is an example fully expanded query as generated from the AV.

```
select
    "MyProject_TIME_YEAR_AD#MyProject_TIME_YEAR_HIER#TIME_YEAR_ATTR" "column0",
    "MyProject_PROD_TOTAL_PRODUCT_AD#MyProject_ATTRHIER_PROD_BUSINESS_LEVEL_ATTR" "column 1",
    "MyProject_PROD_TOTAL_PRODUCT_AD#MyProject_PROD_TOTAL_PRODUCT_HIER#PROD_CATEGORY_ATTR" "column2",
    "MyProject_PROD_TOTAL_PRODUCT_AD#MyProject_PROD_TOTAL_PRODUCT_HIER#PROD_MARKET_ATTR" "column3",
    "MyProject_PROD_TOTAL_PRODUCT_AD#MyProject_PROD_TOTAL_PRODUCT_HIER#PROD_SECTOR_ATTR" "column4",
    "MyProject_PROD_TOTAL_PRODUCT_AD#MyProject_PROD_TOTAL_PRODUCT_HIER#PROD_SUB_SECTOR_ATTR" "column5",
    "MyProject_PROD_TOTAL_PRODUCT_AD#MyProject_PROD_TOTAL_PRODUCT_HIER#PROD_HO_BRAND_ATTR" "column6",
    "MEASURES#MI_EKA_1_2" "column7"
from
(select
    "MyProject_PROD_TOTAL_PRODUCT_AD"."MyProject_PROD_TOTAL_PRODUCT_HIER"."PROD_HO_BRAND_ATTR"
        "MyProject_PROD_TOTAL_PRODUCT_AD#MyProject_PROD_TOTAL_PRODUCT_HIER#PROD_HO_BRAND_ATTR",
    "MyProject_PROD_TOTAL_PRODUCT_AD"."MyProject_PROD_TOTAL_PRODUCT_HIER"."PROD_SUB_SECTOR_ATTR"
        "MyProject_PROD_TOTAL_PRODUCT_AD#MyProject_PROD_TOTAL_PRODUCT_HIER#PROD_SUB_SECTOR_ATTR",
    "MyProject_PROD_TOTAL_PRODUCT_AD"."MyProject_PROD_TOTAL_PRODUCT_HIER"."PROD_SECTOR_ATTR"
        "MyProject_PROD_TOTAL_PRODUCT_AD#MyProject_PROD_TOTAL_PRODUCT_HIER#PROD_SECTOR_ATTR",
```

```
        "MyProject_PROD_TOTAL_PRODUCT_AD"."MyProject_PROD_TOTAL_PRODUCT_HIER"."PROD_MARKET_ATTR"
            "MyProject_PROD_TOTAL_PRODUCT_AD#MyProject_PROD_TOTAL_PRODUCT_HIER#PROD_MARKET_ATTR",
        "MyProject_PROD_TOTAL_PRODUCT_AD"."MyProject_PROD_TOTAL_PRODUCT_HIER"."PROD_CATEGORY_ATTR"
            "MyProject_PROD_TOTAL_PRODUCT_AD#MyProject_PROD_TOTAL_PRODUCT_HIER#PROD_CATEGORY_ATTR",
"MyProject_PROD_TOTAL_PRODUCT_AD"."MyProject_ATTRHIER_PROD_BUSINESS_LEVEL_HIER"."PROD_BUSINESS_LEVEL_
ATTR"
"MyProject_PROD_TOTAL_PRODUCT_AD#MyProject_ATTRHIER_PROD_BUSINESS_LEVEL_HIER#PROD_BUSINESS_LEVEL_
ATTR",
        "MyProject_TIME_YEAR_AD"."MyProject_TIME_YEAR_HIER"."TIME_YEAR_ATTR"
            "MyProject_TIME_YEAR_AD#MyProject_TIME_YEAR_HIER#TIME_YEAR_ATTR",
        "MyProject_TIME_YEAR_AD"."MyProject_TIME_YEAR_HIER"."TIME_DAY_ATTR"
            "MyProject_TIME_YEAR_AD#MyProject_TIME_YEAR_HIER#TIME_DAY_ATTR",
        "MyProject_PROD_TOTAL_PRODUCT_AD"."MyProject_PROD_TOTAL_PRODUCT_HIER"."PROD_SAP_CODE_ATTR"
            "MyProject_PROD_TOTAL_PRODUCT_AD#MyProject_PROD_TOTAL_PRODUCT_HIER#PROD_SAP_CODE_ATTR",
        "MEASURES"."MI_EKA_1_2" "MEASURES#MI_EKA_1_2"
    from
        (with
            SNG_PAR_DATA$ as
            (select /*+ vector_transform &/
                H0."PROD_CATEGORY"
"MyProject_PROD_TOTAL_PRODUCT_AD#MyProject_PROD_TOTAL_PRODUCT_HIER#PROD_CATEGORY_ATTR",
                H0."PROD_MARKET"
"MyProject_PROD_TOTAL_PRODUCT_AD#MyProject_PROD_TOTAL_PRODUCT_HIER#PROD_MARKET_ATTR",
                H0."PROD_SECTOR"
"MyProject_PROD_TOTAL_PRODUCT_AD#MyProject_PROD_TOTAL_PRODUCT_HIER#PROD SECTOR_ATTR",
                H0."PROD_SUB_SECTOR"
"MyProject_PROD_TOTAL_PRODUCT_AD#MyProject PROD_TOTAL_PRODUCT_HIER#PROD_SUB_SECTOR_ATTR",
                H0."PROD_HO_BRAND"
"MyProject_PROD_TOTAL_PRODUCT_AD#MyProject_PROD_TOTAL_PRODUCT_HIER#PROD_HO_BRAND_ATTR",
                H0."PROD_BUSINESS_LEVEL"
"MyProject_PROD_TOTAL_PRODUCT_AD#MyProject_ATTRHIER_PROD_BUSINESS_LEVEL_HIER#PROD_BUSINESS_LEVEL_
ATTR",
                H1."TIME_YEAR" "MyProject_TIME_YEAR_AD#MyProject_TIME_YEAR_HIER#TIME_YEAR_ATTR",
                sum(F."MI_EKA_1_2") "MEASURES#MI_EKA_1_2"
            from
                "UWH"."PROD_LB_DIM" H0,
                "UWH"."TIME_LB_DIM" H1,
                "UWH"."FSCU_FACT" F,
                "UWH"."GEOG_LB_DIM" S0
            where
                (((((F."PROD_KEY" = H0."PROD_SAP_CODE"
                and
                F."TIME_KEY" = H1."TIME_DAY")
                and
                F."GEOG_KEY" = S0."GEOG_SAP_SALES_CUSTOMER")
                and
                (((((((((1 = 1
                    and
                    H0."PROD_BUSINESS_LEVEL" = 'PN002000000002_1')
                    and
                    6 = 6)
                    and
                    H0."PROD_CATEGORY" = 'PN557969212184_1')
                    and
                    H0."PROD_MARKET" = 'PN902000000252_1')
                    and
                    H0."PROD_SECTOR" = 'PN903000002217_1')
                    and
                    H0."PROD_SUB_SECTOR" = 'PN002005000036_1')
                    and
                    H0."PROD_HO_BRAND" = 'PN000001217035_1')
                    and
                    6 = 6)
                    and
                    1 = 1))
                and
                ((1 = 1
                    and
                    H1."TIME_YEAR" != 'UY2002')
                    and
                    1 = 1))
                and
                (1 = 1
                    and
                    S0."GEOG_NAT_CUSTOMER" in (
                        'AN102050100001697706_1',
                        'AN102050100001697715_1',
                        'AN102050100000008420_1',
                        'AN102050100000008429_1',
```

```
                        'AN102050100000008446_1',
                        'AN102050100000008523_1',
                        'AN102050100000008524_1',
                        'AN102050100000029371_1',
                        'AN102050100000266128_1',
                        'AN102050100001697703_1')))
                group by
                    cast(6 as number(10)),
                    H0."PROD_TOTAL_PRODUCT",
                    H0."PROD_CATEGORY",
                    H0."PROD_MARKET",
                    H0."PROD_SECTOR",
                    H0."PROD_SUB_SECTOR",
                    H0."PROD_HO_BRAND",
                    cast(1 as number(10)),
                    H0."PROD_BUSINESS_LEVEL",
                    cast(1 as number(10)),
                    H1."TIME_YEAR"
            )
            select /*+ no_merge
                            opt_param('optimizer_capture_sql_plan_baselines','false')
                            opt_param('optimizer_use_sql_plan__baselines','false')
                            analytic_view_sql */
                C."MyProject_PROD_TOTAL_PRODUCT_AD#MyProject_PROD_TOTAL_PRODUCT_HIER#PROD_CATEGORY_
ATTR",
                C."MyProject_PROD_TOTAL_PRODUCT_AD#MyProject_PROD_TOTAL_PRODUCT_HIER#PROD_MARKET_ATTR",
                C."MyProject_PROD_TOTAL_PRODUCT_AD#MyProject_PROD_TOTAL_PRODUCT_HIER#PROD_SECTOR_ATTR",
                C."MyProject_PROD_TOTAL_PRODUCT_AD#MyProject_PROD_TOTAL_PRODUCT_HIER#PROD_SUB_SECTOR_
ATTR",
                C."MyProject_PROD_TOTAL_PRODUCT_AD#MyProject_PROD_TOTAL_PRODUCT_HIER#PROD_HO_BRAND_
ATTR",
                cast(null as varchar2(43))
"MyProject_PROD_TOTAL_PRODUCT_AD#MyProject_PROD_TOTAL_PRODUCT_HIER#PROD_SAP_CODE_ATTR",
                cast(6 as number(10)) "MyProject_PROD_TOTAL_PRODUCT_AD#MyProject_PROD_TOTAL_PRODUCT_HIER#DEPTH",
C."MyProject_PROD_TOTAL_PRODUCT_AD#MyProject_ATTRHIER_PROD_BUSINESS_LEVEL_HIER#PROD_BUSINESS_LEVEL_
ATTR",
                cast(1 as number(10)) "MyProject_PROD_TOTAL_PRODUCT_AD#MyProject_ATTRHIER_PROD_BUSINESS_LEVEL_
HIER#DEPTH",
                C."MyProject_TIME_YEAR_AD#MyProject_TIME_YEAR_HIER#TIME_YEAR_ATTR",
                cast(null as varchar2(14)) "MyProject_TIME_YEAR_AD#MyProject_TIME_YEAR_HIER#TIME_DAY_ATTR",
                cast(1 as number(10)) "MyProject_TIME_YEAR_AD#MyProject_TIME_YEAR_HIER#DEPTH",
                C."MEASURES#MI_EKA_1_2"
            from
                SNG_PAR_DATA$ C
            where
                (1 = 1
                and
                1 = 1)
    ) "AV"
    where
        (("MyProject_PROD_TOTAL_PRODUCT_AD#MyProject_PROD_TOTAL_PRODUCT_HIER#DEPTH" = 6
        and
        "MyProject_PROD_TOTAL_PRODUCT_AD#MyProject_ATTRHIER_PROD_BUSINESS_LEVEL_HIER#DEPTH" = 1)
        and
        "MyProject_TIME_YEAR_AD#MyProject_TIME_YEAR_HIER#DEPTH" = 1)
) "FSCU_FACT"
```

The following is an example explain plan for the transformed query.

| Operation | Cumulative Seconds | Rows |
|---|---|---|
| SELECT STATEMENT | 1 | 2 |
|   TEMP TABLE TRANSFORMATION | 1 | 2 |
|     LOAD AS SELECT (CURSOR DURATION MEMORY) | 1 | 1 |
|       PX COORDINATOR | 1 | 1 |
|         PX SEND QC (RANDOM) | 1 | 1 |
|           HASH GROUP BY | 1 | 1 |
|             PX RECEIVE | 1 | 1 |
|               PX SEND HASH | 1 | 1 |
|                 KEY VECTOR CREATE BUFFERED | 1 | 1 |
|                   PX BLOCK ITERATOR | 1 | 370 |
|                     TABLE ACCESS INMEMORY FULL | 1 | 370 |

| Operation | Cumulative Seconds | Rows |
|---|---|---|
| LOAD AS SELECT (CURSOR DURATION MEMORY) | 1 | 1 |
|   PX COORDINATOR | 1 | 2 |
|     PX SEND QC (RANDOM) | 1 | 2 |
|       HASH GROUP BY | 1 | 2 |
|         PX RECEIVE | 1 | 2 |
|           PX SEND HASH | 1 | 2 |
|             KEY VECTOR CREATE BUFFERED | 1 | 2 |
|               PX BLOCK ITERATOR | 1 | 731 |
|                 TABLE ACCESS INMEMORY FULL | 1 | 731 |
| LOAD AS SELECT (CURSOR DURATION MEMORY) | 1 | 1 |
|   PX COORDINATOR | 1 | 1 |
|     PX SEND QC (RANDOM) | 1 | 1 |
|       HASH GROUP BY | 1 | 1 |
|         PX RECEIVE | 1 | 4 |
|           PX SEND HASH | 1 | 4 |
|             KEY VECTOR CREATE BUFFERED | 1 | 4 |
|               PX BLOCK ITERATOR | 1 | 179K |
|                 TABLE ACCESS INMEMORY FULL | 1 | 179K |
| PX COORDINATOR | 1 | 2 |
|   PX SEND QC (RANDOM) | 1 | 2 |
|     VIEW | 1 | 2 |
|       HASH JOIN BUFFERED | 1 | 2 |
|         PX RECEIVE | 1 | 2 |
|           PX SEND HASH | 1 | 2 |
|             HASH JOIN BUFFERED | 1 | 2 |
|               PX RECEIVE | 1 | 8 |
|                 PX SEND HYBRID HASH | 1 | 8 |
|                   STATISTICS COLLECTOR | 1 | 2 |
|                     HASH JOIN BUFFERED | 1 | 2 |
|                       PX RECEIVE | 1 | 4 |
|                         PX SEND HYBRID HASH | 1 | 4 |
|                           STATISTICS COLLECTOR | 1 | 1 |
|                             PX BLOCK ITERATOR | 1 | 2 |
|                               TABLE ACCESS FULL | | |
|                       PX RECEIVE | | |
|                         PX SEND HYBRID HASH | 1 | 2 |
|                           VIEW | 1 | 2 |
|                             HASH GROUP BY | 1 | 2 |
|                               PX RECEIVE | 1 | 8 |
|                                 PX SEND HASH | 1 | 8 |
|                                   VECTOR GROUP BY | 1 | 8 |
|                                     HASH GROUP BY | 1 | 0 |
|                                       KEY VECTOR USE | 1 | 713 |
|                                         KEY VECTOR USE | 1 | 713 |
|                                           KEY VECTOR USE | 1 | 713 |
|                                             PX BLOCK ITERATOR | 1 | 713 |
|                                               TABLE ACCESS INMEMORY FULL | 1 | 713 |
|         PX RECEIVE | | |
|           PX SEND HYBRID HASH | 1 | 0 |
|             PX BLOCK ITERATOR | 1 | 1 |
|               TABLE ACCESS FULL | 1 | 1 |
|   PX RECEIVE | 1 | 2 |
|     PX SEND HASH | 1 | 2 |
|       PX BLOCK ITERATOR | 1 | 2 |
| TABLE ACCESS FULL | 1 | 2 |

The timings for the example transformed query are as follows, contrasted with the timings for the example untransformed query.

| | Without Transform | With Transform |
|---|---|---|
| Elapsed Time (s) | 293.89 | 0.99 |
| Database Time (s) | 862.00 | 0.92 |
| CPU Time (s) | 862.00 | 0.88 |

The key takeaway from the above example is that the exact same legacy query was executed in both cases. The presence of the AV metadata enabled the transform, optimizing a legacy query from nearly five minutes in elapsed time to less than a second.

9.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

9.1 Metadata Definitions

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the database dictionary. Metadata that defines an analytic view may be available as stored in the database dictionary. The metadata for the analytic view in the database dictionary is referred when determining whether and how to rewrite a query to access the analytic view and whether the rewrite applies or does not apply base table transform.

9.2 Database Operation

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

9.3 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

9.4 Query Optimization Overview

Query transformation is a set of techniques used by an optimizer to rewrite a query for optimization. A query rewrite technique may rewrite a representation of a query from one form to another form as long as the two forms are semantically equivalent to each other. The representation of the query may be the query expression or code itself or may be an internally and/or externally recognized representation of the query, such as a query execution tree or other data structure. If the representation does not include the query expression itself, the representation may include data that describes processes that may be performed to execute the query, such as a query execution plan (QEP). A QEP is a set of directives and metadata that is prepared for an execution engine.

As used herein, a query representation is "rewritten" when the representation represents a rewritten version of the query, after the query has been rewritten from a first version to a second version. A first version may be an original query or may be another version rewritten from the original query. Two query representations are semantically equivalent to each other when the two query representations, if executed, would produce equivalent result sets, even if the result sets are assembled in different manners by the two query representations.

9.5 Query Optimization and Execution Plans

When a database server receives the original statement of a database command, the database server must first determine which actions should be performed to execute the database command, and then perform those actions. The act of preparing for performance of those actions is generally referred to as "compiling" the database command, while performing those actions is generally referred to as "executing" the database command. During the compilation of a query statement, the database server may perform a significant amount of preliminary work for the statement, such as parsing, semantic analysis, and execution plan generation.

A database command submitted to a database server goes through a query compilation phase where the database command is parsed and optimized. Query optimization selects an optimal execution plan which is then passed on to a query execution engine as a query execution plan to be executed during runtime.

Query optimization generates one or more different candidate execution plans for a database command, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, a full outer join, and importantly, a partial group by operator.

A query optimizer may optimize a database command by transforming the database command. In general, transforming a data command involves rewriting a database command into another semantically equivalent database command that should produce the equivalent result and that can potentially be executed more efficiently, i.e. one for which a potentially more efficient and less costly execution plan can be generated. Examples of query transformations include view merging, subquery unnesting, predicate move-around and push-down, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
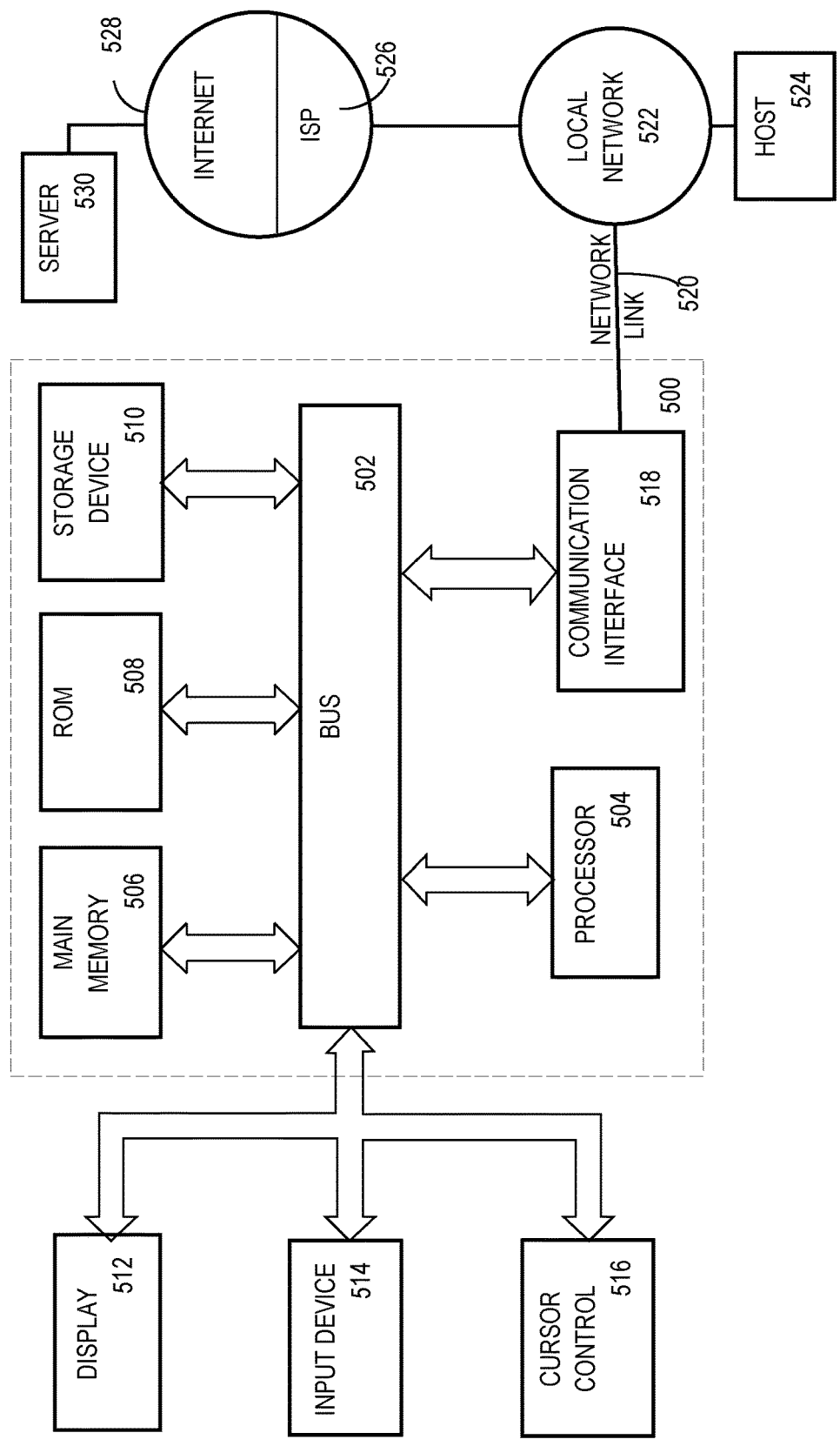
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
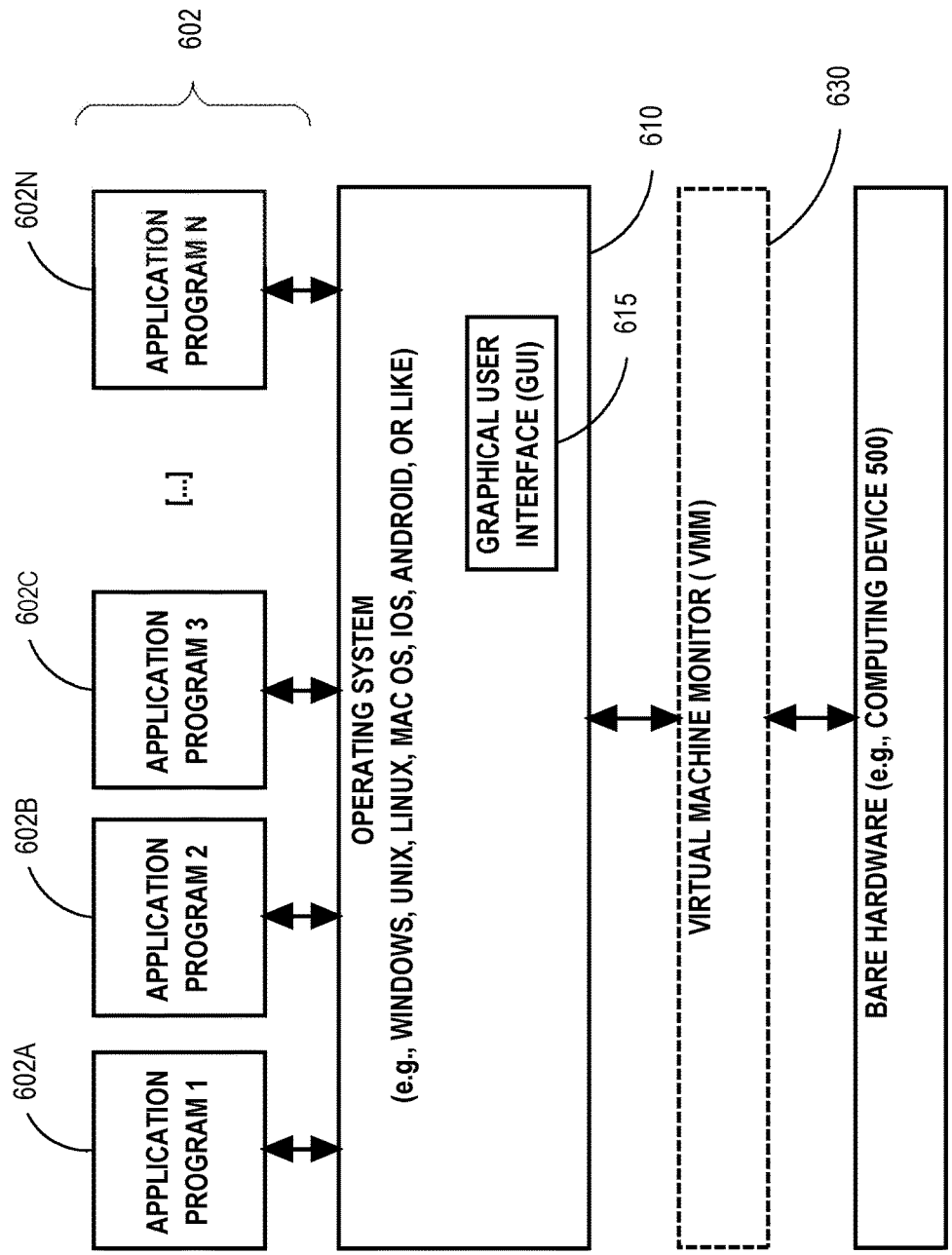
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing metadata that defines a particular unmaterialized analytic view that is based on one or more organizing operations that respectively specify one or more organizing columns of one or more organizing tables, wherein:
        the particular unmaterialized analytic view is not defined with a query, and
        said one or more organizing operations contains a join operation that specifies a dimension column of a dimension table and a join column of a fact table;
    receiving an original query that does not reference the particular unmaterialized analytic view, wherein the original query specifies at least one organizing operation of said one or more organizing operations on which the particular unmaterialized analytic view is based;
    determining, based on said at least one organizing operation that the original query specifies and said metadata that defines the particular unmaterialized analytic view, that the original query satisfies one or more rewrite criteria;
    generating, in response to said determining that the original query satisfies the one or more rewrite criteria, a rewritten query that references the particular unmaterialized analytic view based on the original query that does not reference the particular unmaterialized analytic view.

2. The method of claim 1 wherein said one or more rewrite criteria comprises at least one rewrite criterion selected from the group consisting of:
    a rewrite criterion that is satisfied only when all objects referenced by a SQL FROM clause of the original query are defined in a table namespace and referenced in said metadata that defines the particular unmaterialized analytic view, a rewrite criterion that is satisfied only when all tables referenced by a SQL FROM clause of the original query are fact tables and dimension tables in said one or more organizing tables on which the particular unmaterialized analytic view is based, a rewrite criterion that is satisfied only when the original query does not specify a particular join between two tables defined in separate respective databases unless said one or more organizing operations on which the particular unmaterialized analytic view is based includes said particular join, a rewrite criterion that is satisfied only when the original query does not specify a join having a compound predicate that uses multiple dimension hierarchies, a rewrite criterion that is satisfied only when the original query does not contain a group by unless the group by specifies only dimension column(s) of said one or more organizing columns on which the particular unmaterialized analytic view is based, a rewrite criterion that is satisfied only when the original query does not contain a group by that references different levels of a dimension hierarchy, a rewrite criterion that is satisfied only when the original query does not contain an aggregation operation that specifies a column that is not a measure column of the one or more organizing columns on which the particular unmaterialized analytic view is based, and a rewrite criterion that is satisfied only when the original query does not repeatedly reference a particular element of a SQL WITH clause.

3. The method of claim 1 wherein said metadata that defines the particular unmaterialized analytic view comprises a rely flag that indicates whether validity of said metadata that defines the particular unmaterialized analytic view is a prerequisite of said generating the rewritten query.

4. The method of claim 3 wherein said validity of said metadata that defines the particular unmaterialized analytic view consists of validity of a subset, of said metadata that defines the particular unmaterialized analytic view, that is based on the original query.

5. The method of claim 1 further comprising without costing nor thresholding, deciding to generate or reuse a dense key for a particular column specified by a particular organizing operation of said at least one organizing operation specified by the original query.

6. The method of claim 5 wherein said deciding to generate or reuse said dense key without costing nor thresholding comprises embedding a hint within said rewritten query.

7. The method of claim 1 wherein:
said original query contains no subquery;
said generating said rewritten query based on the original query that contains no subquery comprises generating a subquery.

8. The method of claim 1 wherein:
the original query does not specify a group by clause;
the original query further specifies
a select distinct clause based solely on organizing column(s) specified by a grouping operation of said one or more organizing operations on which the particular unmaterialized analytic view is based.

9. The method of claim 1 further comprising using said metadata that defines the particular unmaterialized analytic view for performing, based on a fact table, at least one activity selected from the group consisting of:

caching results of an organizing operation of said at least one organizing operation of the original query,
applying, in a single pass, respective aggregation operations for a plurality of levels of a dimension,
applying a window function, and
filtration during a table scan.

10. The method of claim 9 wherein said caching results of said organizing operation comprises caching results for a level of a multi-level dimension that is not a lowest level of the multi-level dimension.

11. The method of claim 1 further comprising caching, based on the rewritten query that references the particular unmaterialized analytic view, at least one selected from the group consisting of:

a subset of rows of the particular unmaterialized analytic view, and
a subset of columns of the particular unmaterialized analytic view.

12. One or more non-transitory computer-readable media storing instructions that, when executed by one or more processors, cause:

storing metadata that defines a particular unmaterialized analytic view that is based on one or more organizing operations that respectively specify one or more organizing columns of one or more organizing tables, wherein:
the particular unmaterialized analytic view is not defined with a query, and
said one or more organizing operations contains a join operation that specifies a dimension column of a dimension table and a join column of a fact table;

receiving an original query that does not reference the particular unmaterialized analytic view, wherein the original query specifies at least one organizing operation of said one or more organizing operations on which the particular unmaterialized analytic view is based;

determining, based on said at least one organizing operation that the original query specifies and said metadata that defines the particular unmaterialized analytic view, that the original query satisfies one or more rewrite criteria;

generating, in response to said determining that the original query satisfies the one or more rewrite criteria, a rewritten query that references the particular unmaterialized analytic view based on the original query that does not reference the particular unmaterialized analytic view.

13. The one or more non-transitory computer-readable media of claim 12 wherein said one or more rewrite criteria comprises at least one rewrite criterion selected from the group consisting of:

a rewrite criterion that is satisfied only when all objects referenced by a SQL FROM clause of the original query are defined in a table namespace and referenced in said metadata that defines the particular unmaterialized analytic view, a rewrite criterion that is satisfied only when all tables referenced by a SQL FROM clause of the original query are fact tables and dimension tables in said one or more organizing tables on which the particular unmaterialized analytic view is based, a rewrite criterion that is satisfied only when the original query does not specify a particular join between two tables defined in separate respective databases unless said one or more organizing operations on which the particular unmaterialized analytic view is based includes said particular join, a rewrite criterion that is satisfied only when the original query does not specify a join having a compound predicate that uses multiple dimension hierarchies, a rewrite criterion that is satisfied only when the original query does not contain a group by unless the group by specifies only dimension column(s) of said one or more organizing columns on which the particular unmaterialized analytic view is based, a rewrite criterion that is satisfied only when the original query does not contain a group by that references different levels of a dimension hierarchy, a rewrite criterion that is satisfied only when the original query does not contain an aggregation operation that specifies a column that is not a measure column of the one or more organizing columns on which the particular unmaterialized analytic view is based, and a rewrite criterion that is satisfied only when the original query does not repeatedly reference a particular element of a SQL WITH clause.

14. The one or more non-transitory computer-readable media of claim 12 wherein said metadata that defines the particular unmaterialized analytic view comprises a rely flag that indicates whether validity of said metadata that defines the particular unmaterialized analytic view is a prerequisite of said generating the rewritten query.

15. The one or more non-transitory computer-readable media of claim 14 wherein said validity of said metadata that defines the particular unmaterialized analytic view consists of validity of a subset, of said metadata that defines the particular unmaterialized analytic view, that is based on the original query.

16. The one or more non-transitory computer-readable media of claim 12 wherein the instructions further cause without costing nor thresholding, deciding to generate or reuse a dense key for a particular column specified by a particular organizing operation of said at least one organizing operation specified by the original query.

17. The one or more non-transitory computer-readable media of claim 16 wherein said deciding to generate or reuse said dense key without costing nor thresholding comprises embedding a hint within said rewritten query.

18. The one or more non-transitory computer-readable media of claim 12 wherein:

said original query contains no subquery;

said generating said rewritten query based on the original query that contains no subquery comprises generating a subquery.

19. The one or more non-transitory computer-readable media of claim 12 wherein:

the original query does not specify a group by clause;

the original query further specifies a select distinct clause based solely on organizing column(s) specified by a grouping operation of said one or more organizing operations on which the particular unmaterialized analytic view is based.

20. The one or more non-transitory computer-readable media of claim 12 wherein the instructions further cause using said metadata that defines the particular unmaterialized analytic view for performing, based on a fact table, at least one activity selected from the group consisting of:

caching results of an organizing operation of said at least one organizing operation of the original query, applying, in a single pass, respective aggregation operations for a plurality of levels of a dimension, applying a window function, and filtration during a table scan.

21. The one or more non-transitory computer-readable media of claim 20 wherein said caching results of said organizing operation comprises caching results for a level of a multi-level dimension that is not a lowest level of the multi-level dimension.

* * * * *

UNITED STATES PATENT AND TRADEMARK OFFICE
CERTIFICATE OF CORRECTION

PATENT NO. : 11,461,328 B2
APPLICATION NO. : 17/027238
DATED : October 4, 2022
INVENTOR(S) : Hartsing et al.

It is certified that error appears in the above-identified patent and that said Letters Patent is hereby corrected as shown below:

On the Title Page

Item (54) and in the Specification, Column 1, Lines 1-4, under Title, delete "SEMATIC" and insert -- SEMANTIC --, therefor.

On page 2, Column 2, Item (56) under Other Publications, Line 12, delete "Allownace" and insert -- Allowance --, therefor.

In the Drawings

On sheet 6 of 6, in FIG. 6, under Reference Numeral 630, Line 1, delete "( VMM)" and insert -- (VMM) --, therefor.

In the Specification

In Columns 27-28, Line 57, delete "TIM E" and insert -- TIME --, therefor.

In Column 37, Line 50, delete "SQL/WL" and insert -- SQL/XML --, therefor.

Signed and Sealed this
Fourteenth Day of March, 2023

*Katherine Kelly Vidal*

Katherine Kelly Vidal
*Director of the United States Patent and Trademark Office*